US012517712B2

(12) United States Patent
Ryspekov

(10) Patent No.: US 12,517,712 B2
(45) Date of Patent: Jan. 6, 2026

(54) EXECUTION OF A CONDITIONAL STATEMENT BY AN ARITHMETIC AND/OR BITWISE UNIT

(71) Applicant: Chariot Technologies Lab, Inc., Wilmington, DE (US)

(72) Inventor: Timur Ryspekov, Almaty (KZ)

(73) Assignee: Chariot Technologies Lab, Inc., Wilmington, DE (US)

( * ) Notice: Subject to any disclaimer, the term of this patent is extended or adjusted under 35 U.S.C. 154(b) by 174 days.

(21) Appl. No.: 18/303,504

(22) Filed: Apr. 19, 2023

(65) Prior Publication Data
US 2023/0333849 A1    Oct. 19, 2023

Related U.S. Application Data

(63) Continuation of application No. PCT/US2021/031996, filed on May 12, 2021, which
(Continued)

(51) Int. Cl.
G06F 8/41    (2018.01)
G06F 7/575   (2006.01)
G06F 9/30    (2018.01)

(52) U.S. Cl.
CPC .............. G06F 8/443 (2013.01); G06F 7/575 (2013.01); G06F 9/30029 (2013.01); G06F 9/30072 (2013.01); *G06F 8/4441* (2013.01)

(58) Field of Classification Search
CPC ........ G06F 8/443; G06F 8/4441; G06F 7/575; G06F 9/30029; G06F 9/30072; G06F 9/30196
See application file for complete search history.

(56) References Cited

U.S. PATENT DOCUMENTS 6,915,410 B2   7/2005   Hyduke
8,180,821 B2   5/2012   Mellott
(Continued)

FOREIGN PATENT DOCUMENTS

CN   101231585 A   7/2008
CN   101278262 A   10/2008
(Continued)

OTHER PUBLICATIONS

Jain, Jawahar, Arithmetic Transform of Boolean Functions, Representations of Discrete Functions—Chapter 6, 1996, 29 pages, [retrieved on Nov. 25, 2024], Retrieved from the Internet: <URL:https://link.springer.com/chapter/10.1007/978-1-4613-1385-4_6>.*
(Continued)

*Primary Examiner* — Geoffrey R St Leger
(74) *Attorney, Agent, or Firm* — Fish & Richardson P.C.

(57) ABSTRACT

Methods, systems, and apparatus, including computer programs encoded on computer storage media, for execution of a conditional statement by an arithmetic and/or bitwise unit. A computer program that comprises a conditional statement that comprises a Boolean condition is accessed. The Boolean condition is transformed into an arithmetic and/or bitwise expression of the Boolean condition. An arithmetic and/or bitwise expression of the computer program comprises the arithmetic and/or bitwise expression of the Boolean condition in place of the Boolean condition. The arithmetic and/or bitwise expression of the computer program is executed by an arithmetic and/or bitwise operation unit of a processor.

44 Claims, 21 Drawing Sheets

Related U.S. Application Data is a continuation-in-part of application No. 17/076,726, filed on Oct. 21, 2020, now Pat. No. 11,029,920.

(56) References Cited

U.S. PATENT DOCUMENTS

| | | | |
|---|---|---|---|
| 9,460,075 | B2 | 10/2016 | Mungi et al. |
| 9,588,765 | B2 | 3/2017 | Fletcher |
| 9,618,925 | B2 | 4/2017 | Eldridge et al. |
| 11,029,920 | B1 | 6/2021 | Ryspekov |
| 2004/0083251 | A1 | 4/2004 | Geiringer et al. |
| 2009/0158054 | A1* | 6/2009 | Dijk ............ G06F 7/72 707/999.005 |
| 2010/0199354 | A1 | 8/2010 | Eker |
| 2015/0363390 | A1 | 12/2015 | Mungi et al. |
| 2019/0317766 | A1 | 10/2019 | Zhang et al. |
| 2020/0366492 | A1 | 11/2020 | Covaci |

FOREIGN PATENT DOCUMENTS

| | | | | |
|---|---|---|---|---|
| CN | 108292295 | | 7/2018 | |
| CN | 111406379 A | | 7/2020 | |
| GB | 2482976 A | * | 2/2012 | ........... G06F 16/212 |
| JP | H09319782 A | * | 12/1997 | |
| JP | 2008-305185 | | 12/2008 | |
| JP | 2011-197951 | | 10/2011 | |
| JP | 2015-201119 | | 11/2015 | |
| KR | 10-2020-0086282 | | 7/2020 | |
| TW | 200837604 A | | 9/2008 | |
| TW | 200905559 A | | 2/2009 | |
| TW | 201617929 A | | 5/2016 | |
| WO | WO 2019/092545 | | 5/2019 | |

OTHER PUBLICATIONS

International Preliminary Report on Patentability in International Appln. No. PCT/US2021/031996, mailed on May 4, 2023, 7 pages.
International Search Report and Written Opinion in International Appln. No. PCT/US2021/031996, mailed on Sep. 10, 2021, 11 pages.
Mora-Mora et al., "Mathematical model of stored logic based computation", Mathematical and Computer Modelling 52 (2010) 1243-1250.
Olsen, "Introduction of the Residue Number Arithmetic Logic Unit With Brief Computational Complexity Analysis", White paper, Rev 1.45, excerpted from "General Arithmetic in Residues", Nov. 12, 2012, pp. 1-20, 2012.
Patentmaniac, Patentability Search Report, May 29, 2020, 26 pages.
Robert D. Cameron et al.; Bitwise Data parallelism in Regular Expression Matching; ACM, pp. 139-150; Retrieved on Jan. 26, 2021 (2014).
Weijie Feng et al., NeuReduce Reducing Mixed Boolean-Arithmetic Expressions by Recurrent Neural network; Association for Computational Linguistics; retrieved on Jan. 26, 2021 (2020).

* cited by examiner

*310*

If (boolean condition *301*) Then
   (consequent task *302*)
Else
   (alternative task *303*)
End If

FIG. 3

| 1 | int equals (int x, int y) { |
|---|---|
| 2 | int z = 0 ; |
| 3 | if (x = = y ){ |
| 4 | z = 1; |
| 5 | } |
| 6 | else{ |
| 7 | z = 0; |
| 8 | } |
| 9 | return z; |
| 10 | } |

FIG. 11A

| 1 | int equals (int x, int y) { |
|---|---|
| 2 | int z = 0 ; |
| 3 | z = (1 << ( x-y ) ) % 2; |
| 4 | |
| 5 | return z; |
| 6 | } |

FIG. 11B

```
1   equals (int, int):
2            push     rbp
3            mov      rbp, rsp
4            mov      DWORD PTR [rbp-20], edi
5            mov      DWORD PTR [rbp-24], esi
6            mov      DWORD PTR [rbp-4], 0
7            mov      eax, DWORD PTR [rbp-20]
8 ✓          cmp      eax, DWORD PTR [rbp-24]
9            jne      .L2
10           mov      DWORD PTR [rbp-4], 1
11           jmp      .L3
12  .L2:
13           mov      DWORD PTR [rbp-4], 0
14  .L3:
15           mov      eax, DWORD PTR [rbp-4],
16           pop      rbp
17           ret
```

FIG. 11C

|    |          |                          |
|----|----------|--------------------------|
| 1  | equals (int, int) :                 ||
| 2  | push     | rbp                      |
| 3  | mov      | rbp, rsp                 |
| 4  | mov      | DWORD PTR [rbp-20], edi  |
| 5  | mov      | DWORD PTR [rbp-24], esi  |
| 6  | mov      | DWORD PTR [rbp-4], 0     |
| 7  | mov      | eax, DWORD PTR [rbp-20]  |
| 8  | sub      | eax, DWORD PTR [rbp-24]  |
| 9  | mov      | edx, 1                   |
| 10 | mov      | ecx, eax                 |
| 11 | sal      | edx, cl                  |
| 12 | mov      | eax, edx                 |
| 13 | cdq      |                          |
| 14 | shr      | edx, 31                  |
| 15 | add      | eax, edx                 |
| 16 | and      | eax, 1                   |
| 17 | sub      | eax, edx                 |
| 18 | mov      | DWORD PTR [rbp-4], eax   |
| 19 | mov      | eax, DWORD PTR [rbp-4]   |
| 20 | pop      | rbp                      |
| 21 | ret      |                          |

FIG. 11D

```
1   #include <iostream>
2   using namespace std;
3   int equals (int x, int y) {                    ⌐1201
4       if (x == y) {
5           cout<<"Equals" ;          ⌐1202
6       }
7       else {
8           cout<<"Not equals" ;
9       }                              ⌐1210A
10
11
12      return 0;
13  }
14
```

```
1  .LC0:
2      .string "Equals"
3  .LC1:
4      .string "Not Equals"
5  equals (int, int):
6      push    rbp
7      mov     rbp, rsp
8      sub     rsp, 16
9      mov     DWORD PTR [rbp - 4], edi
10     mov     DWORD PTR [rbp - 8], esi
11     mov     eax, DWORD PTR [rbp - 4]
12     cmp     eax, DWORD PTR [rbp - 8]
13     jne     L2
14     mov     esi, OFFSET FLAT: .LC0
15     mov     edi, OFFSET FLAT: _ZSt4cout
16     call    std::basic_ostream<char, std::char_traits<char> >& std::operator<< <std::char_traits<char> >(std::basic_ostream<char, std::char_traits<char> >&, char const*)
17     jmp     L3
18 .L2:
19     mov     esi, OFFSET FLAT: .LC1
20     mov     edi, OFFSET FLAT: _ZSt4cout
21     call    std::basic_ostream<char, std::char_traits<char> >& std::operator<< <std::char_traits<char> >(std::basic_ostream<char, std::char_traits<char> >&, char const*)
22 .L3:
23     mov     eax, 0
24     leave
25     ret
```

```
1   
2   LC0:
3        string "Equals"
4   LC1:
5        string "Not equals"
6   equal ( int, int):
7        push  rbp
8        mov   rbp, rsp
9        sub   rsp, 64
10       mov   DWORD PTR (rbp-52), edi
11       mov   DWORD PTR (rbp-56), esi
12       mov   eax, DWORD PTR (rbp-52)
13       sub   eax, DWORD PTR (rbp-56)
14       mov   DWORD PTR (rbp-4), eax
15       mov   eax, DWORD PTR (rbp-4)
16       mov   edx, 1
17       mov   ecx, eax
18       sal   edx, cl
19       mov   eax, edx
20       cdq
21       shr   edx, 31
22       add   eax, edx
23       and   eax, 1
24       sub   eax, edx
25       mov   DWORD PTR (rbp-8), eax
26       mov   QWORD PTR (rbp-16), OFFSET FLAT: L2
27       mov   QWORD PTR (rbp-24), OFFSET FLAT: L3
28       mov   rax, QWORD PTR (rbp-16)
29       mov   QWORD PTR (rbp-40), rax
30       mov   rax, QWORD PTR (rbp-24)
         mov   QWORD PTR (rbp-48), rax
```

| | | |
|---|---|---|
| 31 | mov | eax, DWORD PTR [rbp-8] |
| 32 | cdqe | |
| 33 | mov | rax, QWORD PTR [rbp-48+rax*8] |
| 34 | nop | |
| 35 | jmp | rax |
| 36 | L2: | |
| 37 | mov | esi, OFFSET FLAT: LC0 |
| 38 | mov | edi, OFFSET FLAT: _ZSt4cout |
| 39 | call | std::basic_ostream<char, std::char_traits<char> >& std::operator<< <std::char_traits<char> >(std::basic_ostream<char, std::char_traits<char> >&, char const*) |
| 40 | mov | esi, OFFSET FLAT: _ZSt4endlIcSt11char_traitsIcEERSt13basic_ostreamIT_T0_ES6_ |
| 41 | mov | rdi, rax |
| 42 | call | std::basic_ostream<char, std::char_traits<char> >::operator<<(std::basic_ostream<char, std::char_traits<char> >& (*)(std::basic_ostream<char, std::char_traits<char> >&)) |
| 43 | jmp | L5 |
| 44 | L3: | |
| 45 | mov | esi, OFFSET FLAT: LC1 |
| 46 | mov | edi, OFFSET FLAT: _ZSt4cout |
| 47 | call | std::basic_ostream<char, std::char_traits<char> >& std::operator<< <std::char_traits<char> >(std::basic_ostream<char, std::char_traits<char> >&, char const*) |
| 48 | mov | esi, OFFSET FLAT: _ZSt4endlIcSt11char_traitsIcEERSt13basic_ostreamIT_T0_ES6_ |
| 49 | mov | rdi, rax |
| 50 | call | std::basic_ostream<char, std::char_traits<char> >::operator<<(std::basic_ostream<char, std::char_traits<char> >& (*)(std::basic_ostream<char, std::char_traits<char> >&)) |
| 51 | nop | |
| 52 | L5: | |
| 53 | mov | eax, 0 |
| 54 | leave | |
| 55 | ret | |

FIG. 12D (cont)

EXECUTION OF A CONDITIONAL STATEMENT BY AN ARITHMETIC AND/OR BITWISE UNIT

CROSS REFERENCE TO RELATED APPLICATIONS

This application is a continuation application of and claims the benefit of priority to International Application No. PCT/US2021/031996, filed on May 12, 2021, which claims priority to U.S. patent application Ser. No. 17/076,726, filed Oct. 21, 2020, the contents of which are hereby incorporated by reference.

BACKGROUND

This description relates generally to computing systems and more particularly to the execution of conditional statements and expressions by a computing circuit.

In computer science, conditional statements are features of a programming language, which perform different computations or actions depending on whether a specified Boolean condition evaluates to True or False.

The execution of a conditional statement requires the evaluation of a Boolean condition, and thus the comparison of numbers. This comparison determines whether one number is greater than, equal, or less than the other number. Boolean conditions are conventionally evaluated by a digital comparator. A digital comparator is a hardware electronic device that takes two numbers as input in binary form and determines whether one number is greater than, less than or equal to the other number.

Conditional statements use the output of the digital comparator to switch to executing either one or another piece of the computer code. Each whole if-then do operation of the digital comparator takes at least 2 clock cycles of a processor. In addition, the digital comparator is often unable to perform parallel execution of multilevel conditional tasks. As a result, the digital comparator (or the logic block of ALU) often constitutes a bottleneck of an integrated circuit processor.

SUMMARY

This specification describes how a system can execute a computer program comprising conditional statements solely with an arithmetic block and/or a bitwise unit of a processor.

Particular embodiments of the subject matter described in this specification can be implemented so as to realize one or more of the following advantages.

The conditional statements are transformed into a set of arithmetic and/or bitwise operations. As such, the computer program can be executed solely by an arithmetic and/or bitwise unit of the processor. In particular, the computer program can be executed without using a digital comparator. As explained above, each whole operation of the digital comparator takes at least 2 clock cycles of a processor. Arithmetic units of a processor, on the other hand, are capable of executing the vast majority of arithmetic calculations in 1 clock cycle. As such, the techniques described in this specification improve the execution speed of a computer program by the processor. The digital comparator can be removed which allows more space for arithmetic and/or bitwise operation units. For a constant chip size, the power of the chip can thus be increased resulting in an increased execution speed.

Further, the digital comparator is often unable to perform parallel execution of multilevel conditional tasks. As a result, the digital comparator often constitutes a bottleneck of an integrated circuit processor. Arithmetic and/or bitwise expressions, on the other hand, can be fragmented into multiples fragments, which can then be executed by multiple arithmetic and/or bitwise blocks in parallel. As such, the techniques described in this specification can further improve the execution speed of the processor by executing the computer program by multiple arithmetic blocks working in parallel.

The method can be used on various levels of any suitable programming language. In particular, the method can be used in any suitable low-level language (e.g., assembly language, or at the level of the instruction set architecture (ISA)), as well as in any suitable high-level programming language (e.g., C++ code, or Java, etc.) of a particular software program.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF DRAWINGS

FIG. 3 is a pseudocode that illustrates the basic structure of an if-then(-else) conditional statement.

FIG. 11A is an example of a C++ computer program that comprises a conditional statement with arithmetic body. FIG. 11B is an example of a C++ computer program resulting from the transformation of the computer program of FIG. 11A. FIG. 11C is an example of an assembly language computer program that comprises a conditional statement with arithmetic body. FIG. 11D is an example of an assembly language computer program resulting from the transformation of the computer program of FIG. 11C.

FIG. 12A is an example of a C++ computer program that comprises a conditional statement with a non-arithmetic body.

FIG. 12C is an example of an assembly language computer program that comprises a conditional statement with non-arithmetic body. FIG. 12D is an example of an assembly language computer program resulting from the transformation of the computer program of FIG. 12C.

DETAILED DESCRIPTION

Figure 1:
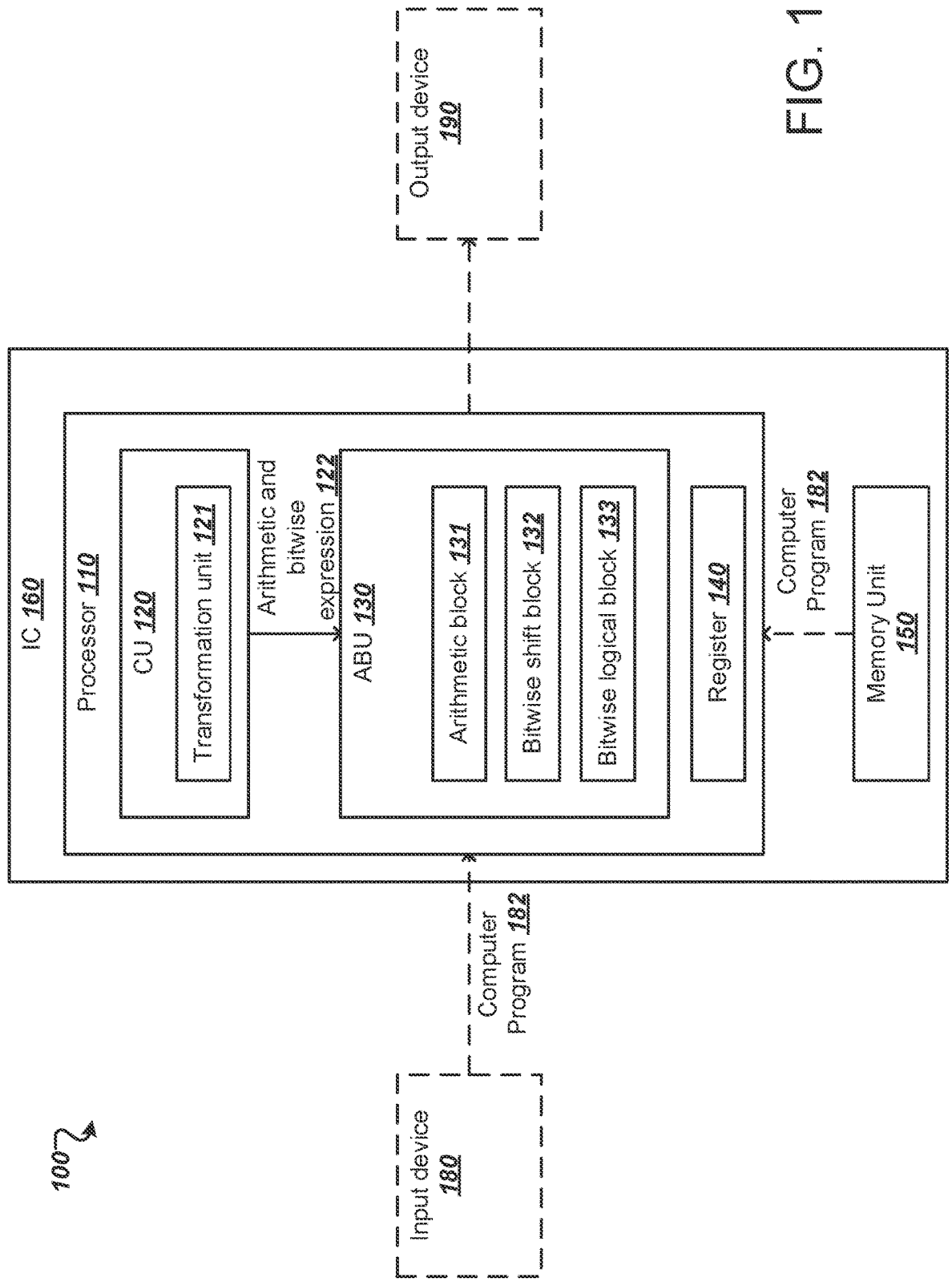
FIG. 1 is a diagram that illustrates an example system.

FIG. 1 is a diagram that illustrates an example system 100. The system 100 is an example of a system that can implement the techniques described in this specification.

The system 100 includes a processor 110, such as a Central Processing Unit (CPU), a Graphics Processing Unit (GPU), a Neural Processing Unit (NPU), a Tensor Processor Unit (TPU), or any other type of processing units that enable the execution of conditional tasks. The processor performs basic arithmetic, logic, controlling, and input/output (I/O) operations specified by instructions in a computer program 182. The processor 110 can be a microprocessor, where the CPU is contained on a single metal-oxide-semiconductor (MOS) integrated circuit (IC) chip 160. The IC that contains a CPU can also contain a memory unit 150 such as a dynamic random-access memory (DRAM), as well as more than one level of cache memory, and peripheral interfaces to connect to input device(s) 180 or output device(s) 190.

The processor 110 includes a number of functional components including one or more arithmetic and/or bitwise operation units (ABUs) 130 that perform arithmetic and bitwise logic operations, one or more registers 140 that supply operands to the ABUs 130 and store the results of ABUs operations, and one or more control units (CUs) 120 that orchestrate the execution of instructions by directing the coordinated operations of the ABUs 130, registers 140 and other components.

The ABU 130 is a digital circuit that performs arithmetic and/or bitwise logic operations. The ABU 130 can include one or more arithmetic blocks 131, one or more bitwise shift blocks 132, and one or more bitwise logical blocks 133. The arithmetic block 131 performs arithmetic operations such as Add, Add with carry, Subtract, Subtract with borrow. The bitwise shift block 132 performs bit shift operations such as Arithmetic shift, Logical shift, Rotate, Rotate through carry. The bitwise logical block 133 performs bitwise logic operations such as AND, OR, Exclusive-OR. In some embodiments, the ABU 130 does not include any digital comparator. In some embodiments, the processor 110 does not include any digital comparator.

In operation, the processor 110 accesses and executes a computer program 182 comprising a sequence of instructions. The computer program 182 can be accessed from the memory unit 150 or from an input device 180. The processor can follow an instruction cycle including fetch, decode and execute steps. Multiple instructions can be fetched, decoded and executed simultaneously. The execute step can consist of a single action or a sequence of actions. During each action, various parts of the processor are electrically connected so they can perform all or part of the desired operation and then the action is completed. The results can be written to one of the registers 140 or to the memory unit 150.

The CU 120 directs the operation of the processor 110. The CU 120 controls the memory 150, ABU 130 to respond to the computer program 182 that has been accessed by the processor. In particular, the CU 120 can direct the operation of the other units by providing timing and control signals.

In some embodiments, the CU 120 comprises a transformation unit 121 that transforms the computer program 182 into an arithmetic and/or bitwise expression 122 of the computer program. The transformation unit 121 identifies and transforms conditional statements found in the computer program 182 into arithmetic and/or bitwise expressions of the conditional statements. The transformation unit 121 generates an arithmetic and/or bitwise expression 122 of the computer program 182 based on the arithmetic and/or bitwise operations and operands. The CU 120 then provides the arithmetic and/or bitwise expression 122 of the computer program 182 to the ABU 130. In other embodiments, the system comprises a separate data processing apparatus that identifies and transforms conditional statements found in the computer program 182 into arithmetic and/or bitwise expressions of the conditional statements.

In some embodiments, the arithmetic and/or bitwise expression of the conditional statements comprises only arithmetic and/or bitwise operations. In some embodiments, substantially all of the conditional statements (e.g., more than 50%, more than 60%, more than 70%, more than 80%, more than 90%, or more than 95%) are transformed, but some conditional statements need not be transformed if the processor still includes a digital comparator that can be used to evaluate a defined proper subset of the conditional statements.

The ABU 130 accesses the arithmetic and/or bitwise expression 122 of the computer program 182 from the CU 120. The ABU 130 can access operands from the registers 140 or the memory unit 150. Operands may also be constants generated by the ABU 130 itself. The ABU 130 may also access status information, which convey information about a previous operation or a current operation. The ABU 130 outputs the result of the performed operations. The result can consist of both a data word, and/or status information. The result can be stored in the register 140 or memory unit 150.

Figure 2:
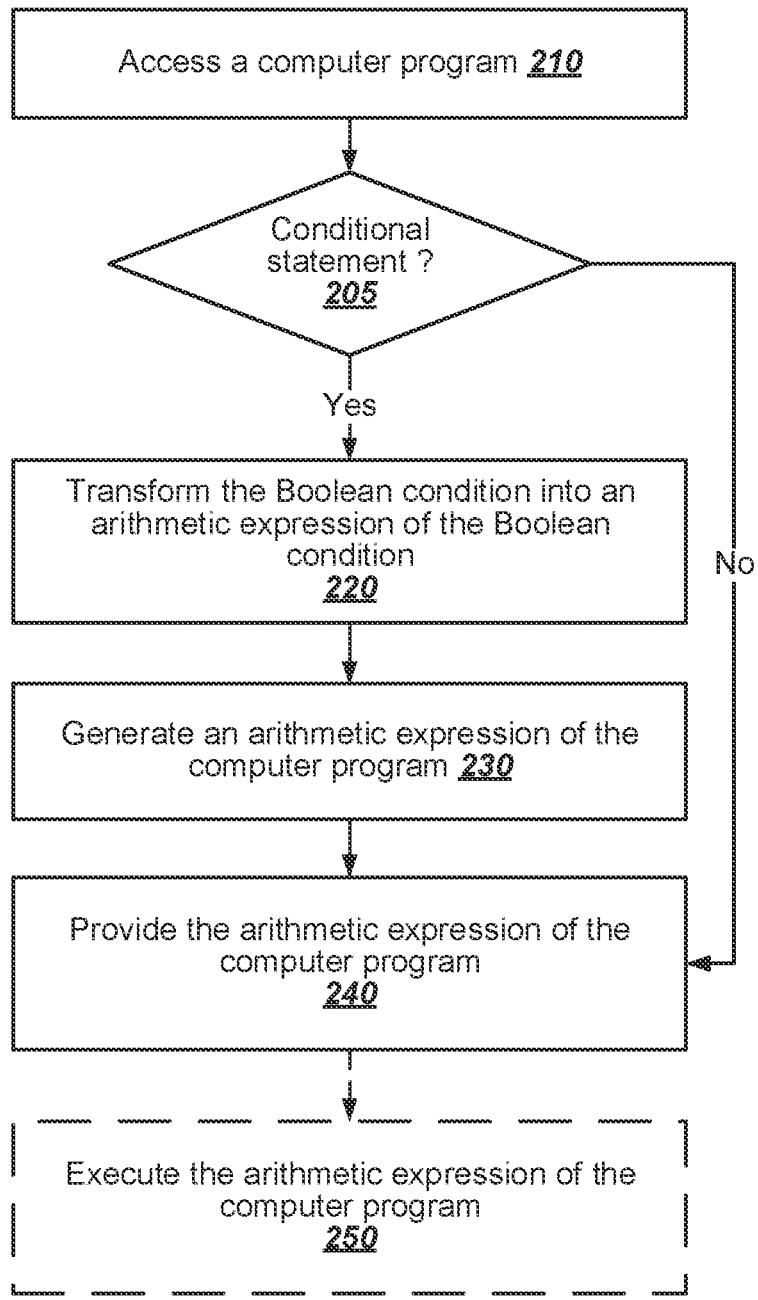
FIG. 2 is a flowchart of an example process for executing a computer program solely with arithmetic and/or bitwise unit(s) of a processor.

FIG. 2 is a flowchart of an example process for executing a computer program. The process can be implemented by one or more computer programs installed on one or more computers in one or more locations and programmed in accordance with this specification. For example, the process can be performed by the system 100 shown in FIG. 1. For convenience, the process will be described as being performed by a system of one or more computers. Some embodiments involve pre-processing the computer program to do the transformation, e.g., on an entirely different computer system, before the transformed computer program is executed on system 100. For example, a source compiler can do the transformation when producing object code and/or machine-level code for a target computer.

The system accesses (210) a computer program (e.g., computer program 182 of FIG. 1). The system determines (205) whether the computer program includes at least one conditional statement including a Boolean condition. If the computer program includes at least one conditional statement, the system transforms (220) the Boolean condition into an arithmetic and/or bitwise expression of the Boolean condition. If the computer program does not include any conditional statement, the system provides (240) the arithmetic and/or bitwise expression of the computer to the ABU 130 for execution.

When executed, a conditional statement causes the processor to perform an associated task depending on whether a specified Boolean condition evaluates to True or False. The task can include one or more computations and/or one or more actions. The specified Boolean condition requires comparison of at least a variable with either a value or another variable. For example, the comparison can determine whether a value of a variable (e.g., A) is greater than (e.g., A≥B), equal (e.g., A=B), or less than (e.g., A<B) a value of another variable (e.g., B). The result of the comparison determines whether the associated task will be executed by the processor.

FIG. 3 is a pseudocode that illustrates the basic structure of an if-then(-else) conditional statement 310. When an interpreter finds an If, it expects a Boolean condition 301 and evaluates that Boolean condition 301 to either of the values True or False. If the condition is True, the processor executes a consequent task 302. Otherwise, the execution continues in the following branch. If there is an alternative task 303 (e.g., in an Else block), the processor executes the alternative task 303. If there is no Else branch, the processor executes the statement following the End If After either branch has been executed, control returns to the point after the end If.

Referring again to FIG. 2, the system (e.g., transformation unit 121) transforms (220) the Boolean condition into an arithmetic and/or bitwise expression of the Boolean condition. The arithmetic and/or bitwise expression of the Boolean condition takes the variables of the conditional statement as variables. In some implementations, the arithmetic and/or bitwise expression of the Boolean condition is such that the output of the arithmetic and/or bitwise expression of the Boolean condition verifies the following two properties. If the values of the variables verify the Boolean condition, the arithmetic and/or bitwise expression of the Boolean condition is equal to 1. If the values of the variables do not verify the Boolean condition, the arithmetic and/or bitwise expression of the Boolean condition is equal to 0. As such, Boolean value TRUE is converted to 1, while Boolean value FALSE is converted to 0. In execution, the arithmetic and/or bitwise expression of the Boolean condition maintains the part of the executable code that is to be executed while nulling the parts that are not to be executed. The transformation of the Boolean condition statement into an arithmetic and/or bitwise expression is described in more details in relation to FIG. 4.

The transformation can be performed at various levels of any suitable programming language. In particular, the method can be used in any suitable low-level language (e.g., assembly language, or at the level of the instruction set architecture (ISA)), as well as in any suitable high-level programming language (e.g., C++ code, or Java, etc.) of a particular software program. The process can be performed as a pre-processing step when compiling source code into executable code for a target machine, or on-the-fly processing when implemented in an interpreter rather than a compiler.

Examples of specific and general transformation formulas that can be used to transform the Boolean condition into an arithmetic and/or bitwise expression are provided below.

Examples of specific transformation formulas (on asm and/or ISA level)

Specific Transformation Formula for Integer, Characters or Booleans Types $$\text{answer} = z^{|k|} \% z \text{ (for } x=y \text{ and } x>=y \text{ conditions)}$$

$$\text{answer} = 1 - z^{|k|} \% z \text{ (for others conditions)}$$

Specific Transformation Formula for Float or Double Types (Floating Point Type Data)

$$\text{answer} = z^{ceil(k)|} \% z \text{ (for } x=y \text{ and } x>=y \text{ conditions)}$$

$$\text{answer} = 1 - z^{ceil(k)|} \% z \text{ (for other conditions)}$$

Examples of general transformation formulas for all data types (incl. arrays and strings)

General Transformation of Boolean Condition "if(=)"

$$\text{answer} = z^{(\Sigma_{i=1}^{N} z^{ceil(|A[i]-B[i]|\%z)}) \% z}$$

General Transformation of Boolean Condition "if (>=)"

$$\text{answer} = z^{(\Sigma_{i=1}^{N} z^{ceil((|A[i]-B[i]|)-(|A[i]-B[i]|))|\%z}) \% z}$$

General Transformation of Boolean Condition "if (<)"

$$\text{answer} = z^{(\Sigma_{i=1}^{N} 1 - z^{ceil((|A[i]-B[i]|)-(|A[i]-B[i]|))|\%z}) \% z}$$

General Transformation of Boolean Condition "if (>)"

$$\text{answer} = z^{(\Sigma_{i=1}^{N} 1 - z^{ceil((|B[i]-A[i]|)-(|B[i]-A[i]|))|\%z}) \% z}$$

Notation:
z is a base number.
A, B is an array comprising N elements.
A[i], B[i] is an element of an array. A single element like an integer, a float, etc. is a one-dimension array (row vector matrix) with only one element.
answer is the arithmetic and/or bitwise expression of the Boolean condition.
% is the remainder of division.
ceil(x) is a ceiling function that maps x to the least integer greater than or equal to x.
if the Boolean condition is x=y, k=x−y
if the Boolean condition is x≥y, k=(x−y)−(|x−y|)
x<y is "else" result for x≥y The base number z can be the base of numeral system. Most arithmetic operations (e.g., power function and the remainder of the division) with the base of numeral system can be calculated immediately with shift operations. In particular, if the processor uses a binary system, z can be equal to 2.

In the case of arrays and strings, the elements of the array can be normalized. Any known normalization methods can be used. This improves the execution speed of the conditional statement.

Referring back to FIG. 2, the system (e.g., transformation unit 121) generates (230) an arithmetic and/or bitwise expression of the computer program. The system replaces the Boolean condition in the computer program with the arithmetic and/or bitwise expression of the Boolean condition. In execution, the arithmetic and/or bitwise expression of the Boolean condition maintains the part of the executable code that is to be executed while nulling the parts that are not to be executed. The generation of the arithmetic and/or bitwise expression of the computer program is described in more details in relation to FIGS. 8 and 9.

The system (e.g., CU 120) provides (240) the arithmetic and/or bitwise expression of the computer program to an arithmetic and/or bitwise unit (e.g., ABU 130) for execution. The arithmetic and/or bitwise expression of the computer program can be in any suitable programming language, and in particular, any suitable low-level language (e.g., assembly language, or at the level of the instruction set architecture (ISA)), as well as in any suitable high-level programming language (e.g., C++ code, or Java, etc.) of a particular software program. The execution of the arithmetic and/or bitwise expression of the computer program does not require any direct comparison of numbers. The system can thus provide the arithmetic and/or bitwise expression of the computer program to the arithmetic and/or bitwise unit, and in particular an arithmetic and/or bitwise unit that does not include any digital comparator.

The system (e.g., ABU 130) executes (250) the arithmetic and/or bitwise expression of the computer program. The execution of the arithmetic and/or bitwise expression of the conditional statement provides the same result as the execution of the conditional statement while not requiring any comparison of numbers. As such, a processor that does not include any digital comparator can execute the computer program. The execution of a conditional statement with arithmetic body is described in more details in relation to FIGS. 11A and 11B. The execution of a conditional statement with non-arithmetic body is described in more details in relation to FIGS. 12A and 12B. As described in more details in relation to FIG. 10, the arithmetic and/or bitwise expression of the computer program can be fragmented and the fragments run in parallel (e.g., simultaneously, or concurrently) in particular in the case of multilevel conditional statements.

Figure 4:
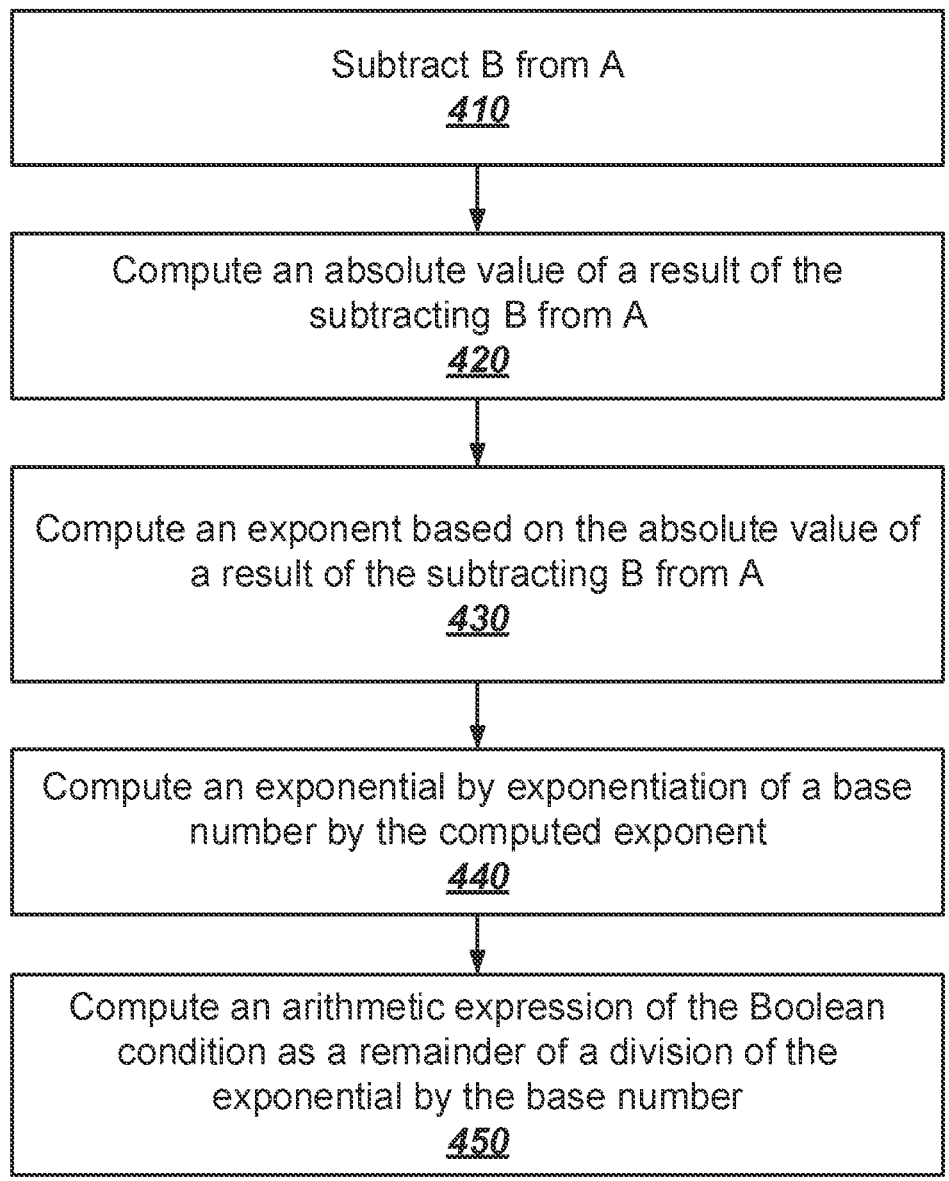
FIG. 4 is a flowchart of an example process for transforming a Boolean condition into an arithmetic and/or bitwise expression.

FIG. 4 is a flowchart of an example process for transforming (e.g., 220 of FIG. 2) a Boolean condition into an arithmetic and/or bitwise expression. The Boolean condition takes A as a first variable and B as a second variable.

The system (e.g., transformation unit 121) subtracts (410) B from A.

The system (e.g., transformation unit 121) computes (420) an absolute value of the result of the subtraction.

The system (e.g., transformation unit 121) computes (430) an exponent based on the absolute value of the result of the subtraction.

The system (e.g., transformation unit 121) computes (440) an exponential by exponentiation of a base number by the computed exponent. The base number can be any number. In particular, the base number can be the base of the numeral system used by the processor. In particular, if the processor uses a binary system, the base number can be equal to 2. Most arithmetic operations (e.g., power function and the remainder of the division) with the base of numeral system can be calculated immediately with shift operations. In particular, the exponentiation of the base number by the computed exponent can be performed by shifting a bit, which is equal to 1, left by a number of places equal to the computed exponent. This improves the speed of execution.

The system (e.g., transformation unit 121) computes (450) the arithmetic and/or bitwise expression of the Boolean condition as a remainder of a division of the exponential by the base number.

The exponent is computed such that the exponent is equal to 0 if the Boolean condition is verified. Any number powered by 0 results in 1. As such, if the Boolean condition is verified, the exponent is equal to 0, and the arithmetic and/or bitwise expression of the Boolean condition will be equal to 1.

In some embodiments, the base number is 2. If the processor uses a binary system, the remainder of division of the exponential by the base number can be extracted by taking a last bit of the exponential. This reduces the complexity of the calculation.

Figure 5:
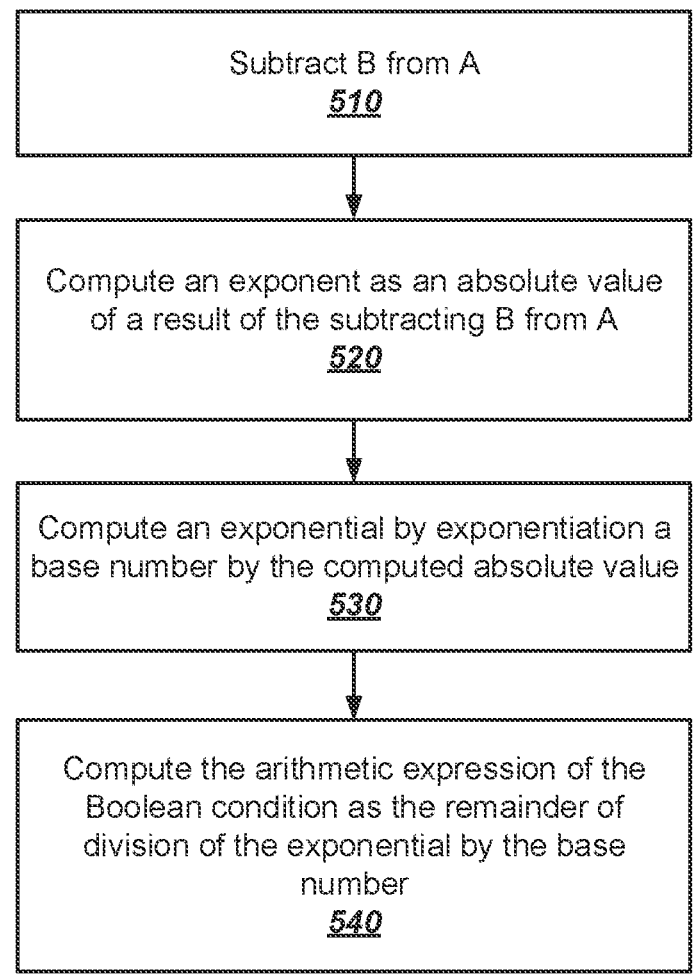
FIG. 5 is a flowchart of an example process for transforming A=B into an arithmetic and/or bitwise expression of A=B.

FIG. 5 is a flowchart of an example process for transforming Boolean condition A=B into an arithmetic and/or bitwise expression of A=B.

The system (e.g., transformation unit 121) subtracts (510) B from A.

The system (e.g., transformation unit 121) computes (520) an exponent as the absolute value of the result of 510.

The system (e.g., transformation unit 121) computes (530) an exponential by exponentiation of the base number by the exponent computed at 520.

The system (e.g., transformation unit 121) computes (540) the arithmetic and/or bitwise expression of the Boolean condition as the remainder of division of the exponential computed at 530 by the base number.

The arithmetic and/or bitwise expression of A=B is computed such that the following is verified. If A=B, the exponent is equal to 0, and the arithmetic and/or bitwise expression of A=B is equal to 1. If A≠B, the exponent is not equal to 0, and the arithmetic and/or bitwise expression of A=B is equal to 0.

Figure 6:
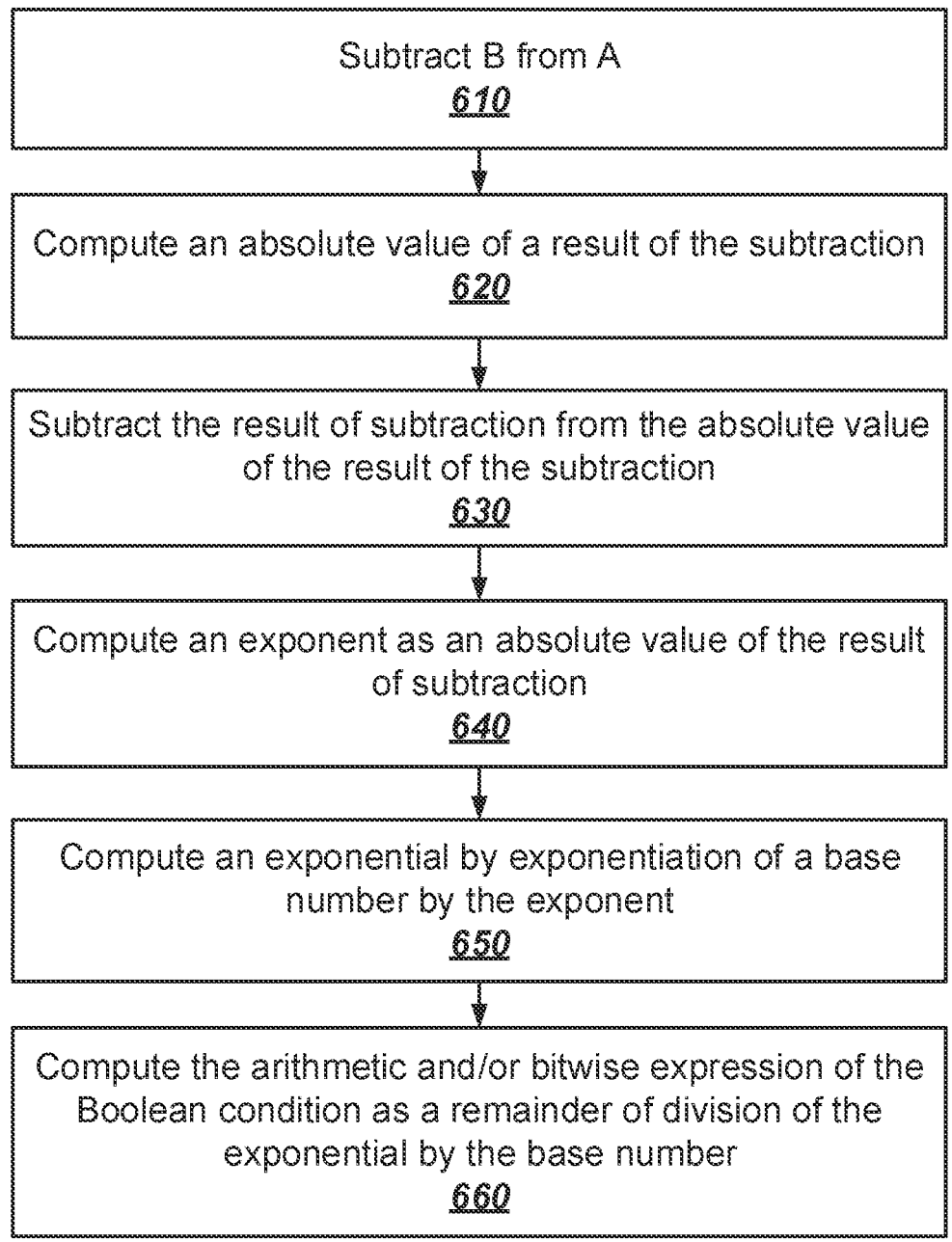
FIG. 6 is a flowchart of an example process for transforming A≥B into an arithmetic and/or bitwise expression of A≥B.

FIG. 6 is a flowchart of an example process for transforming Boolean condition A≥B into an arithmetic and/or bitwise expression of A≥B.

The system (e.g., transformation unit 121) subtracts (610) B from A.

The system (e.g., transformation unit 121) computes (620) an absolute value of result of 610.

The system (e.g., transformation unit 121) subtracts (630) the result of 610 from the result of 620.

The system (e.g., transformation unit 121) computes (640) an exponent as an absolute value of the result of 630.

The system (e.g., transformation unit 121) computes (650) an exponential by exponentiation of a base number by the exponent computed at 640.

The system (e.g., transformation unit 121) computes (660) the arithmetic and/or bitwise expression of the Boolean condition as the remainder of division of the exponential computed at 650 by the base number.

The arithmetic and/or bitwise expression of A≥B is computed such that the following is verified. If A≥B, the exponent is equal to 0, and the arithmetic and/or bitwise expression of A≥B is equal to 1. If A<B, the exponent is not equal to 0, and the arithmetic and/or bitwise expression of A≥B is equal to 0.

Figure 7A:
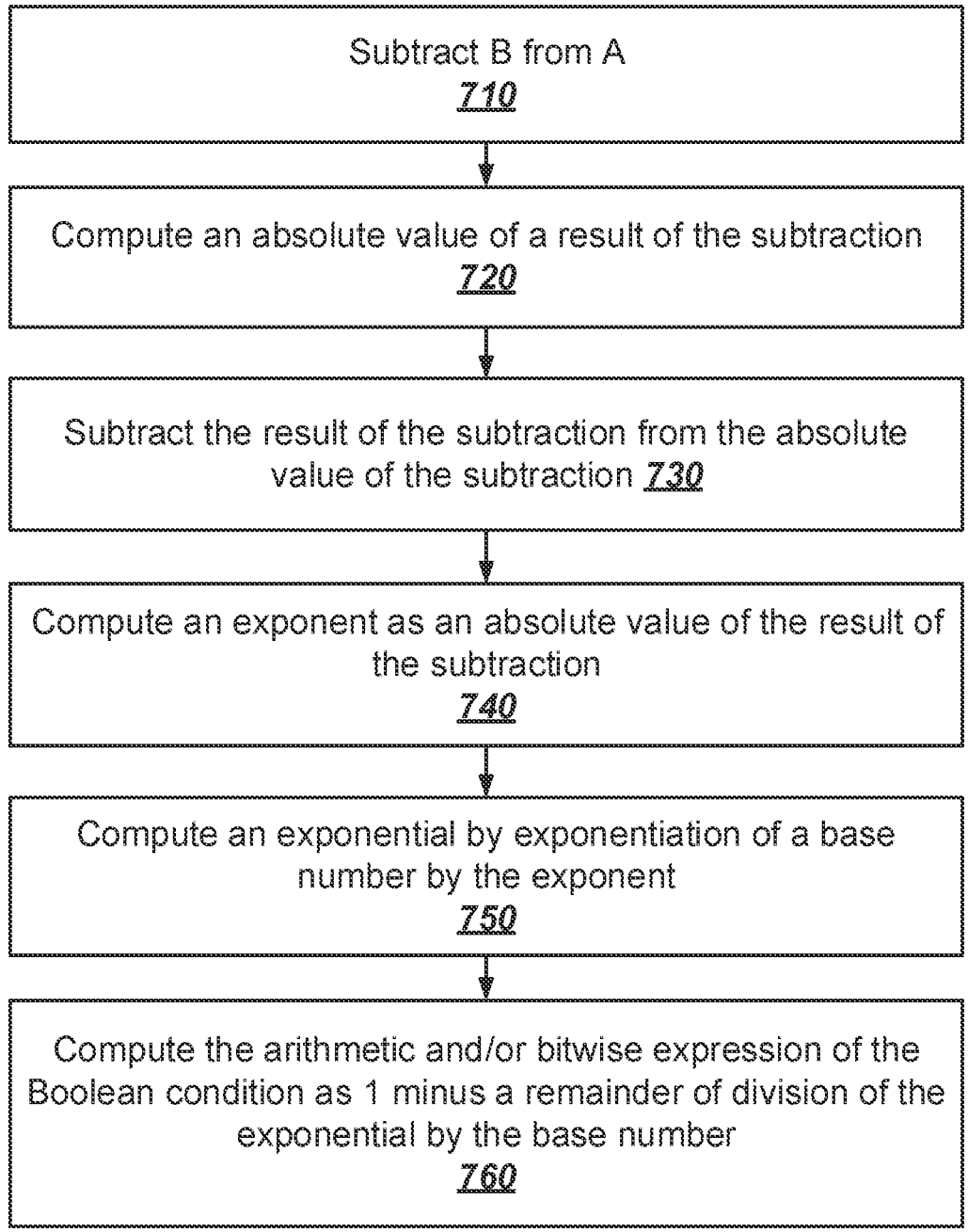
FIGS. 7A and 7B are flowcharts of example processes for transforming A<B into an arithmetic and/or bitwise expression of A<B.

FIG. 7A is a flowchart of an example process for transforming Boolean condition A<B into an arithmetic and/or bitwise expression of A<B.

The system (e.g., transformation unit 121) subtracts (710) B from A.

The system (e.g., transformation unit 121) computes (720) an absolute value of result of 710.

The system (e.g., transformation unit 121) subtracts (730) the result of 710 from the result of 720.

The system (e.g., transformation unit 121) computes (740) an exponent as an absolute value of the result of 730.

The system (e.g., transformation unit 121) computes (750) an exponential by exponentiation of a base number by the exponent computed at 740.

The system (e.g., transformation unit 121) computes (760) the arithmetic and/or bitwise expression of the Boolean condition as the remainder of division of the exponential computed at 750 by the base number.

The arithmetic and/or bitwise expression of A<B is computed such that the following is verified. If A<B, the exponent is equal to 0, and the arithmetic and/or bitwise expression of the Boolean condition is equal to 1. If A≥B, the exponent is not equal to 0, and the arithmetic and/or bitwise expression of the Boolean condition will be equal to 0.

Figure 7B:
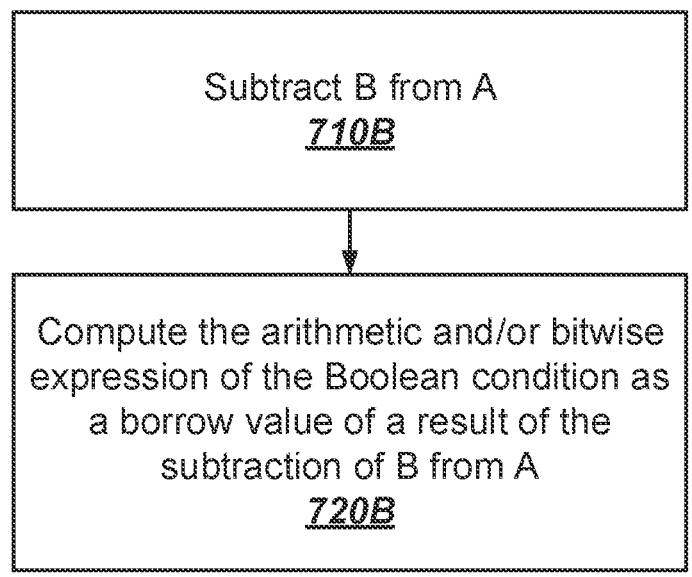

FIG. 7B is a flowchart of another example process for transforming Boolean condition A<B into an arithmetic and/or bitwise expression of A<B.

The system (e.g., transformation unit 121) subtracts (710B) B from A.

The system (e.g., transformation unit 121) computes (720B) the arithmetic and/or bitwise expression of the Boolean condition as a borrow value of the result of the subtraction of B from A.

The arithmetic and/or bitwise expression of A<B is computed such that the following is verified. If A<B, the borrow value of the result of the subtraction of B from A is equal to 1, and the arithmetic and/or bitwise expression of the Boolean condition is equal to 1. If A≥B, the borrow value of the result of the subtraction of B from A is equal to 0, and the arithmetic and/or bitwise expression of the Boolean condition is equal to 0.

Figure 8:
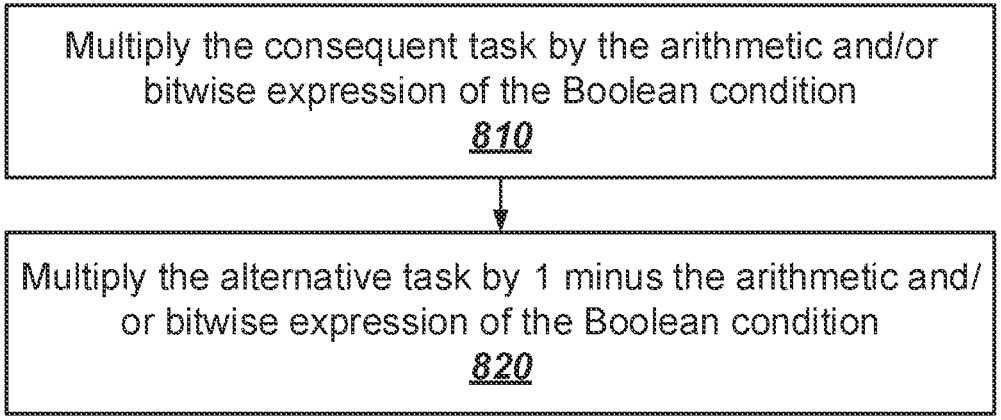
FIG. 8 is a flowchart of an example process for generating an arithmetic and/or bitwise expression of the computer program when the conditional statement has an arithmetic body.

FIG. 8 is a flowchart of an example process for generating (e.g., 230 of FIG. 2) an arithmetic and/or bitwise expression of the computer program when the conditional statement has an arithmetic body. An example is described in more details in relation to FIGS. 11A and 11B.

The system (e.g., transformation unit 121) multiplies (810) the statement of the consequent task (e.g., 302 of FIG. 3) by the arithmetic and/or bitwise expression of the Boolean condition. As such, when the computer program is executed, the following happens. If the Boolean condition is verified, the arithmetic and/or bitwise expression of the Boolean condition is equal to 1, the consequent task is maintained by the multiplication with the arithmetic and/or bitwise expression of the Boolean condition, and the consequent task is executed. If the Boolean condition is not verified, the arithmetic and/or bitwise expression of the Boolean condition is equal to 0, the consequent task is nullified by the multiplication with the arithmetic and/or bitwise expression of the Boolean condition, and the consequent task is not executed.

If the conditional statement comprises an alternative task (e.g., 303 of FIG. 3) that is formulated as an arithmetic statement, the system (e.g., transformation unit 121) multiplies (820) the arithmetic consequent task by 1 minus the arithmetic and/or bitwise expression of the Boolean condition. As such, when the computer program is executed, the following happens. If the Boolean condition is verified, the arithmetic and/or bitwise expression of the Boolean condition is equal to 1. The consequent task is maintained by the multiplication with the arithmetic and/or bitwise expression of the Boolean condition, while the alternative task is nullified by the multiplication with 1 minus the arithmetic and/or bitwise expression of the Boolean condition. As a result, the consequent task is executed, while the alternative task is not. If the Boolean condition is not verified, the arithmetic and/or bitwise expression of the Boolean condition is equal to 0, the consequent task is nullified by the multiplication with the arithmetic and/or bitwise expression of the Boolean condition, while the alternative task is maintained by the multiplication with 1 minus the arithmetic and/or bitwise expression of the Boolean condition. As a result, the alternative task is executed, while the consequent task is not.

Figure 9:
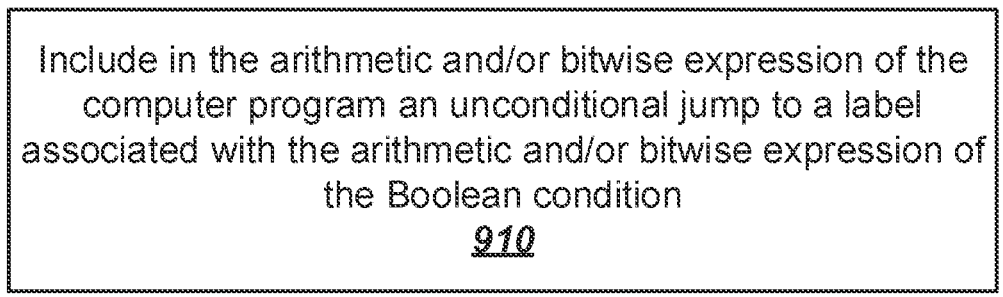
FIG. 9 is a flowchart of an example process for generating an arithmetic and/or bitwise expression of the computer program when the conditional statement has a non-arithmetic body.

FIG. 9 is a flowchart of an example process for generating (e.g., 230 of FIG. 2) an arithmetic and/or bitwise expression of the computer program when the conditional statement has a non-arithmetic body. An example is described in more details in relation to FIGS. 12A and 12B.

The system (e.g., transformation unit 121) includes in the arithmetic and/or bitwise expression of the computer program an unconditional jump to a label associated with the arithmetic and/or bitwise expression of the Boolean condition. The label is initiated with the arithmetic and/or bitwise expression of the Boolean condition such that the label is equal to the start statement of the consequent task (e.g., 302 of FIG. 3) when the arithmetic and/or bitwise expression of the conditions statement is equal to 1. As such, when the computer program is executed, the following happens. If the Boolean condition is verified, the arithmetic and/or bitwise expression of the Boolean condition is equal to 1. The label is equal to the start statement of the consequent task. The unconditional jump statement points to the consequent task. During execution, when the processor finds the unconditional jump statement, the processor executes the consequent task.

If there is an alternative task (e.g., 303 of FIG. 3), the label is further initiated such that it is equal to the start statement of the alternative task when the arithmetic and/or bitwise expression of the conditions statement is equal to 0. As such, when the computer program is executed, the following happens. If the Boolean condition is verified, the arithmetic and/or bitwise expression of the Boolean condition is equal to 1, the label is equal to the start statement of the consequent task, the unconditional jump statement points to the consequent task, and the consequent task is executed. If the conditional statement is not verified, the arithmetic and/or bitwise expression of the Boolean condition is equal to 0, the label is equal to the start statement of the alternative task, the jump statement points to the alternative task, and the alternative task is executed.

Figure 10:
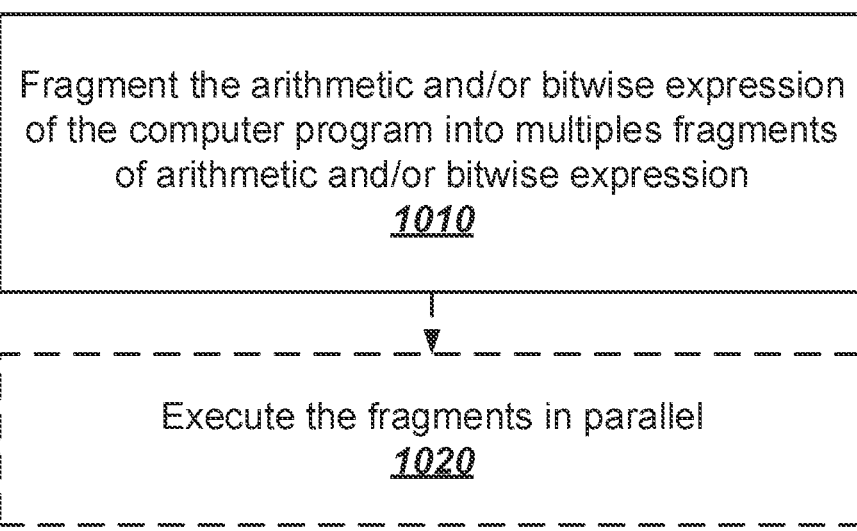
FIG. 10 is a flowchart of an example process for providing the arithmetic and/or bitwise expression of the computer program.

FIG. 10 is a flowchart of an example process for providing (e.g., 240 of FIG. 2) the arithmetic and/or bitwise expression of the computer program and optionally executing (e.g., 250 of FIG. 2) the arithmetic and/or bitwise expression of the computer program. The arithmetic and/or bitwise expression is fragmented. The multiples fragments can then be executed by multiple arithmetic and/or bitwise blocks in parallel. As such, the execution speed of the processor can be improved by executing the computer program by multiple arithmetic blocks working in parallel. Further, multilevel conditional statements can be executed in parallel.

The system (e.g., transformation unit 121) fragments (1010) the arithmetic and/or bitwise expression of the computer program into multiples fragments.

The system (e.g., ABU 130) executes (1020) the fragments in parallel. In particular, the ABU 130 can perform multithreading. The ABU 130 execute at least two fragments in parallel. In particular, the fragments can be executed using Reverse Polish Notation.

Figures 11A, 11B:
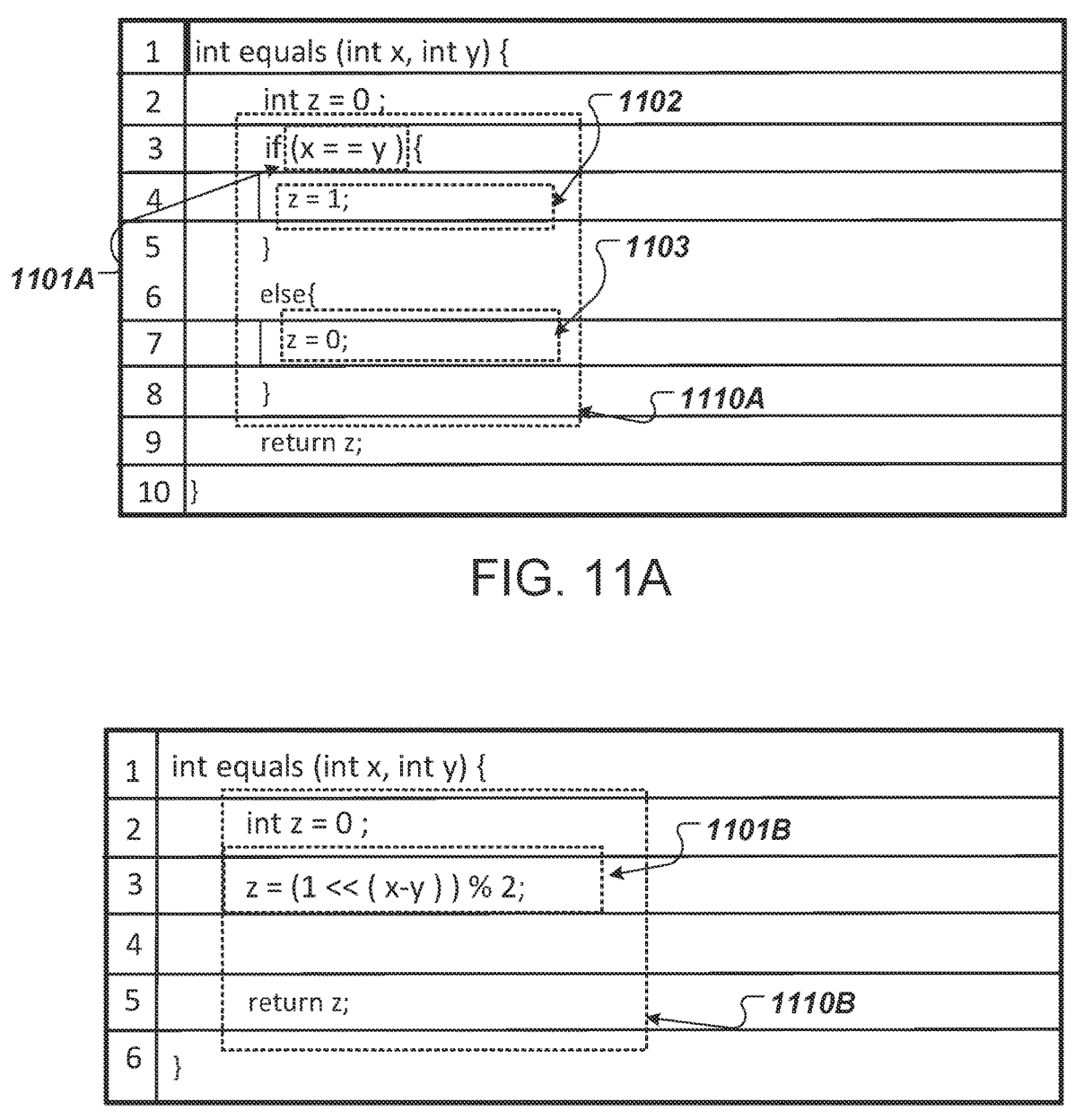

FIG. 11A is an example of a C++ computer program that comprises a conditional statement 1110A with arithmetic body.

The Boolean condition 1101A of the conditional statement 1110A is whether x is equal to y. The consequent task 1102 is that z is equal to 1. The alternative task 1103 is that z is equal to 0. The conditional statement 1110A can be expressed as follows:

If x is equal to y, then z is equal to 1.
If x is not equal to y, then z is equal to 0.
The execution of the conditional statement 1110A thus requires the comparison of variables x and y.

FIG. 11B is an example of a C++ computer program resulting from the transformation of the computer program of FIG. 11A.

The conditional statement 1110A has been transformed into an arithmetic and/or bitwise expression 1110B comprising only arithmetic and/or bitwise operations. The arithmetic and/or bitwise expression 1101B of the Boolean condition is z=1<<(x-y)) %2. As such, if x is equal to y, then z=1<<(x-y)) %2=1, and if x is not equal to y, then z=1<<(x-y)) %2=0.

The execution of the arithmetic and/or bitwise expression 1101B of the conditional statement thus provides the same result as the execution of the conditional statement 1110A but does not require the comparison of variables x and y.

FIG. 11C is an example of an assembly language computer program 1100C that comprises a conditional statement with arithmetic body. FIG. 11D is an example of an assembly language computer program 1100D resulting from the transformation of the computer program of FIG. 11C.

FIG. 12A is an example of a C++ computer program that comprises a conditional statement 1210A with a non-arithmetic body The Boolean condition 1201A of the conditional statement 1210A is whether x is equal to y. The consequent task 1201 is to output "Equals." The alternative task 1202 is to output "Not equals." The conditional statement 1210A can be expressed as follows. If x is equal to y, the program outputs "Equals." If x is not equal to y, the program outputs "Not equals".

Figure 12B:
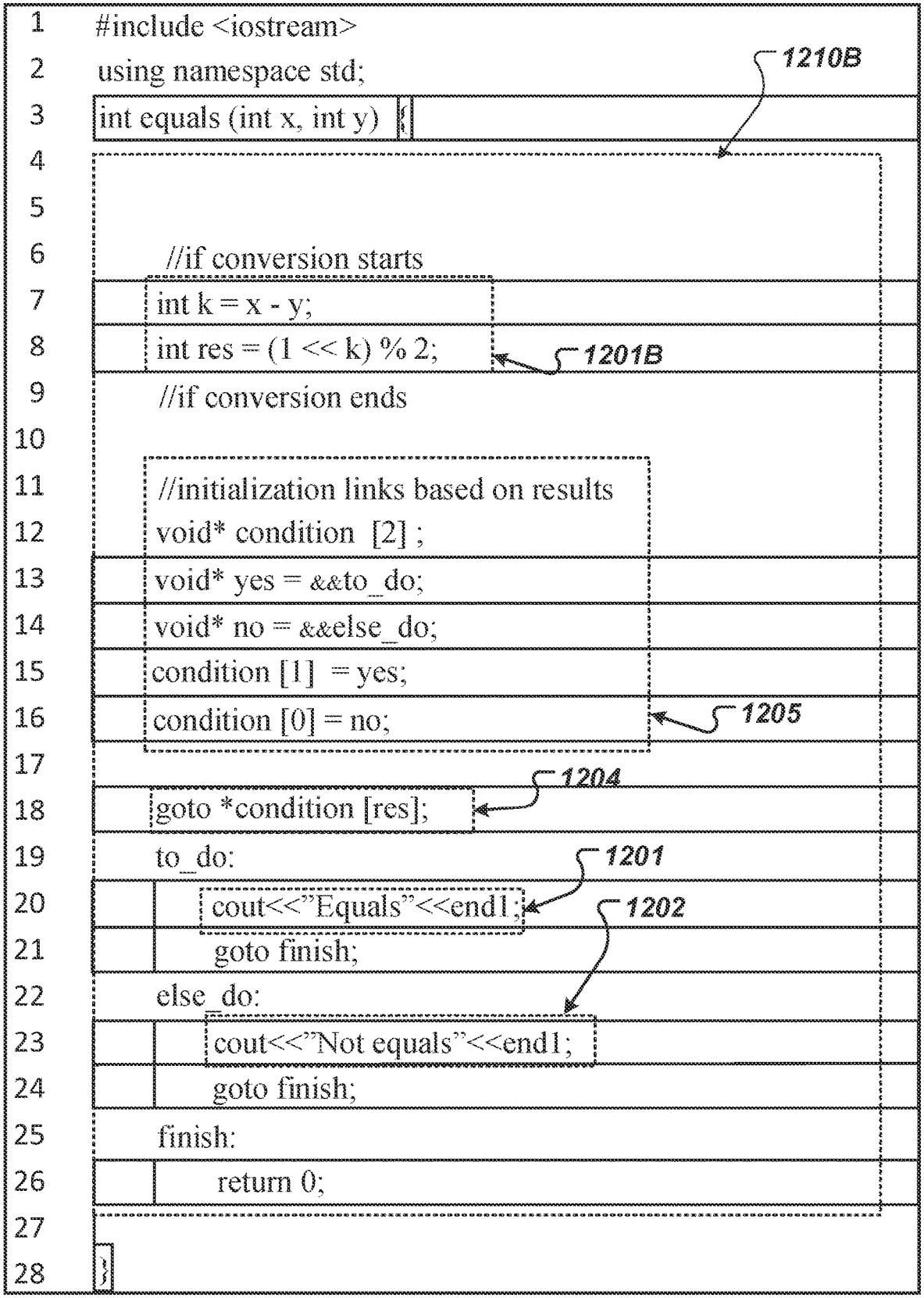
FIG. 12B is an example of a C++ computer program resulting from the transformation of the computer program of FIG. 12A.

FIG. 12B is an example of a C++ computer program resulting from the transformation of the computer program of FIG. 12A.

The conditional statement 1210A has been transformed into an arithmetic and/or bitwise expression 1210B comprising only arithmetic and/or bitwise operations. The arithmetic and/or bitwise expression of the Boolean condition 1201B is res=(1<<k) %2, where k=x-y. As such, if x=y, res=(1<<k) %2=1, while if x y, res=(1<<k) %2=0. An unconditional jump 1204 is initialized in an initialization statement 1205. The unconditional jump provides an unconditional jump to a label ("condition[res]").

When the arithmetic and/or bitwise expression of the conditions statement is equal to 1 (res=1), the label ("condition[1]") is equal to the start statement ("to do") of the consequent task 1201. The unconditional jump statement points to the consequent task 1201. During execution, when the processor finds the unconditional jump statement 1204, the processor executes the consequent task 1201.

When the arithmetic and/or bitwise expression of the conditions statement is equal to 0 (res=0), the label ("condition[0]") is equal to the start statement ("elso_do") of the alternative task 1202. The unconditional jump statement points to the alternative task 1202. During execution, when the processor finds the unconditional jump statement 1204, the processor executes the alternative task 1202.

The execution of the arithmetic and/or bitwise expression of the conditional statement thus provides the same result as the execution of the conditional statement.

FIG. 12C is an example of an assembly language computer program 1200C that comprises a conditional statement with non-arithmetic body. FIG. 12D is an example of an assembly language computer program 1200D resulting from the transformation of the computer program of FIG. 12C.

Figure 13A:
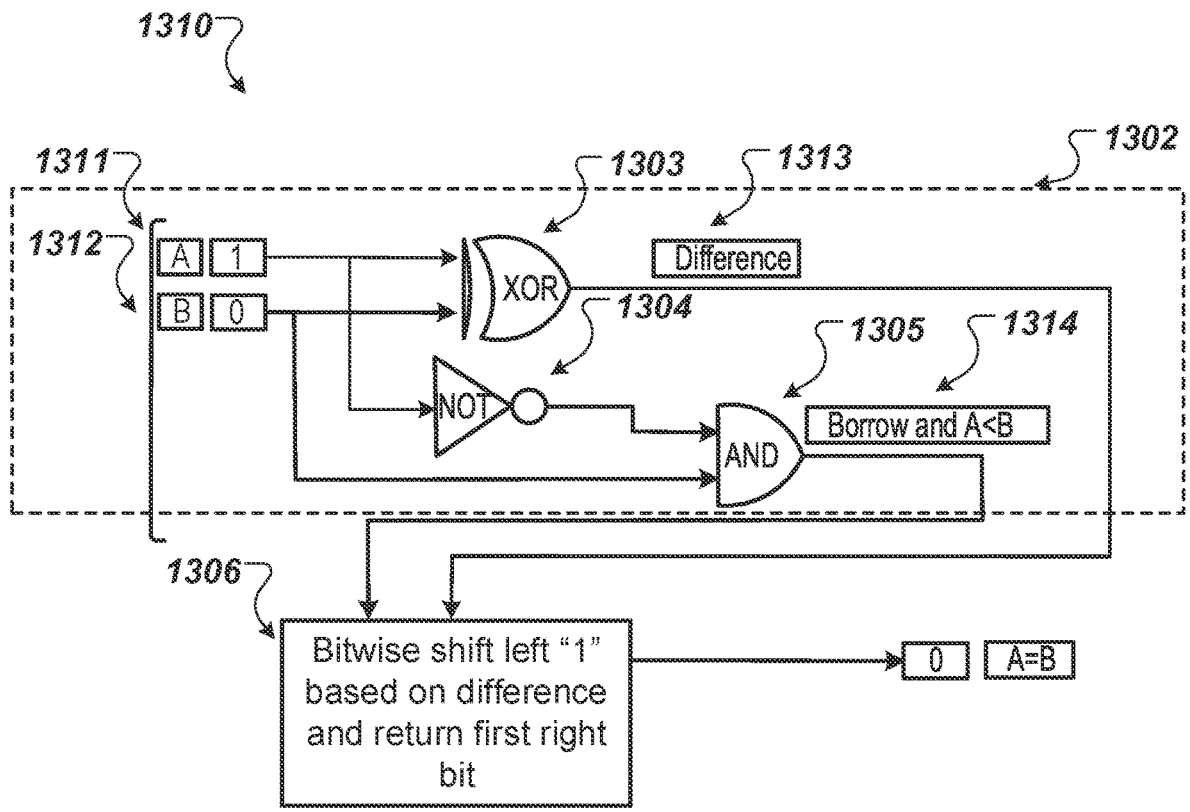
FIG. 13A and FIG. 13B illustrate examples of the combinational logic circuitry of an integrated circuit of an arithmetic and/or bitwise operation unit.

FIG. 13A illustrates an example of a combinational logic circuitry 1310A of an integrated circuit of an ABU.

The combinational logic circuitry 1310A comprises a half subtractor 1302 which is used to perform subtraction of two bits. The half substractor comprises a XOR gate 1303, a NOT gate 1304, and an AND gate 1305. The half substractor 1302 has two inputs: the minuend A 1311 and the subtrahend B 1312. The half substractor 1302 has two outputs: the difference 1313 and borrow out 1314. The borrow out signal 1314 is set when the conditional logic circuitry 1310A needs to borrow from the next digit in a multi-digit subtraction. The borrow out signal 1314 is equal to 1 only if A is equal to 0 and B is equal to 1. The borrow out signal is thus equal to 1 when A<B, and equal to 0 when A≥B. Therefore, the borrow out signal provides an evaluation of Boolean condition A<B.

A shift operator 1306 shifts a bit, which is equal to 1, to the left by a number of places equal to the difference signal 1313. This results in the exponentiation of the base number by the result of the subtraction of B from A. The shift operator 1306 outputs the first right bit of the result which is equal to the remainder of division of the exponential of the bases number by the result of the subtraction of B from A. The output of the shift operator 1306 is thus equal to 1 when A=B, and equal to 0 when A≠B. The shift operator 1306 output therefore provides an evaluation of Boolean condition A=B.

Figure 13B:
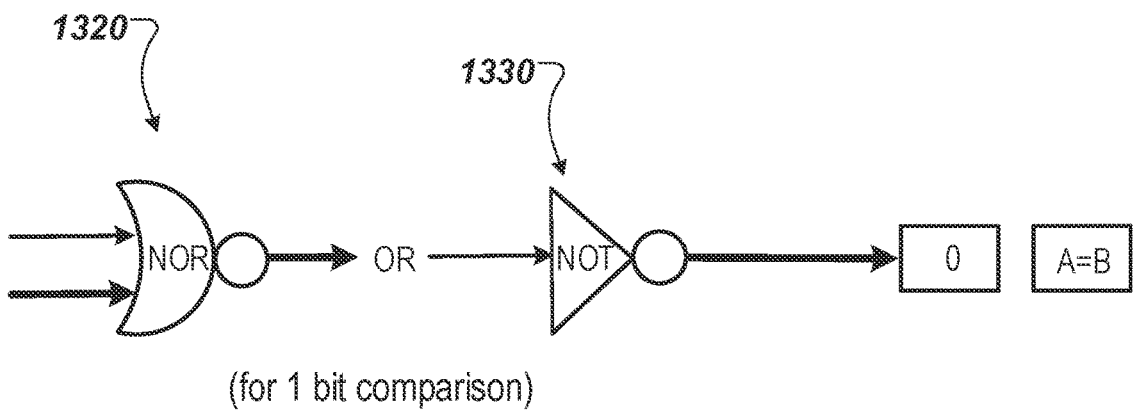

FIG. 13B illustrates an example of a combinational logic circuitry 1310B of an integrated circuit of an ABU when the variables A and B each only include one bit. The conditional logic circuitry 1310B includes a NOR gate 1320, and a NOT gate 1330. The output of the NOT gate 1330 provides an evaluation of Boolean condition A=B.

In addition, in some implementations, the following techniques are used when the Boolean condition is between matrix type data (arrays, lists, vectors, etc.) in which elements are represented by numbers and/or characters. Using these techniques can improve the efficiently of comparing matrix type data, and thus also improve the process of transforming the Boolean condition into an arithmetic and/or bitwise expression of the Boolean condition. Rather than comparing each respective number or character (in the same place) in matrix type variables A and B, the size of the matrix type objects (e.g., the arrays) to be compared can be reduced, in order to improve the efficiency of transforming the Boolean condition into the arithmetic and/or bitwise expression of the Boolean condition, as described in connection with FIG. 14.

Figure 14:
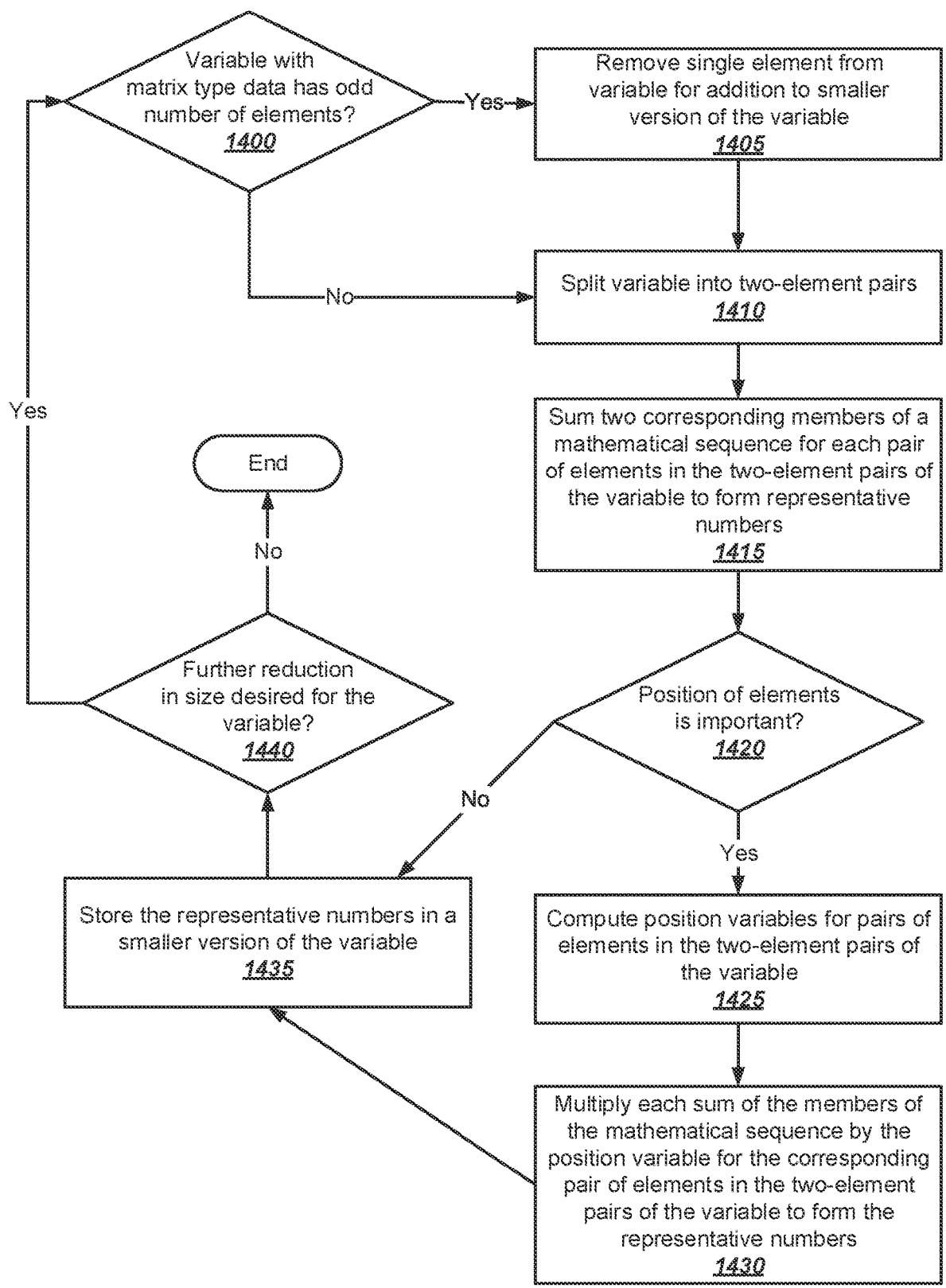
FIG. 14 is a flowchart of an example process for reducing the size of matrix type data.

FIG. 14 is a flowchart of an example process for reducing the size of matrix type data, e.g., which is to be compared. The process can be implemented by one or more computer programs installed on one or more computers in one or more locations and programmed in accordance with this specification. For example, the process can be performed by the system 100 shown in FIG. 1. For convenience, the process will be described as being performed by a system of one or more computers, but it should be noted that the process of FIG. 14 can be part of the pre-processing of the computer program to do the transformation and so it need not be performed on the same computer system that executes the transformed computer program. In addition, while the process of FIG. 14 is described in connection with a single variable with matrix type data, e.g., data objects such as arrays, lists, vectors, etc., it should be understood that this process is performed for each of variable (e.g., variable A and variable B) to be compared in the Boolean condition.

The system determines (1400) whether the variable has an odd number of elements. If so, a single element can be removed (1405) from the variable before the variable is split (1410) during subsequent processing, and this single element is added to the smaller version of the variable that is formed. For example, a new matrix type variable can be instantiated for the smaller version of the variable, and the data value of an element (e.g., the last element) of the input variable can be added to the new variable (e.g., in the first element of the new variable) and then that element can be removed from the initial variable resulting in an even number of elements for the split (1410). Note that the same single element (in terms of position, e.g., in an array) should be removed (1405) (for addition to a smaller version of the variable) from each respective variable to be compared. Further, some implementations work with the variable in place, and do not involve instantiating a new version of the variable; thus, references to the variable below include implementations that instantiate new variables and implementations that do not. Finally, note that multi-dimensional arrays can be handled by performing the same process described here recursively.

The variable is split (1410) into two-element pairs, where the data values in each of the two-element pairs will be used to form data values for the smaller variable. For example, the first two-element pair can be the first and second elements of the input variable, the second two-element pair can be the third and fourth elements of the input variable, the third two-element pair can be the fifth and sixth elements of the input variable, and so on. Also, two-element pairs can be formed in other suitable ways (where each element of the variable is part of only one pair). Note that the split (1410) into pairs should be done in the same manner for each set of compared variables, e.g., for all compared variables of a given type. In general, a smaller version of each variable to be compared by the Boolean condition is formed using representative numbers from a mathematical sequence with an increasing difference between members of the mathematical sequence, where each representative number is one number that represents a pair of numbers or characters from the two-element pairs, and the smaller version of each variable will also include a single element (e.g., the last data element) from the input variable when that input variable has an odd number of data elements. Moreover, in some implementations, all optimization steps for each of the compared (matrix type) variables are performed absolutely identically.

To represent the pair of numbers or characters as a one number, one can use the property of mathematical sequences with an increasing difference between the members of these sequences, which says that the sum of two members of mathematical sequences with increasing difference (geometric sequence, etc.) is unique. Thus, for each pair of elements in the two-element pairs of the variable, corresponding members of the mathematical sequence are summed (1415) where the members of the mathematical sequence correspond to the pair of elements in the two-element pairs of the variable where each data value in the pair of elements is used as a position index for a respective one of the members of the mathematical sequence. This can be understood as replacing each element in the pair by a member of the mathematical sequence having its index in the sequence being equal to the data value of the element in the pair, and then adding together the two members of the mathematical sequence for each pair of elements in the two-element pairs of the variable to form each respective representative number in the smaller (reduced-sized) variable. Note that for deriving representative numbers (1415) for compared (matrix type) variables, the same (one chosen) mathematical sequence is applied; and in some implementations, the same mathematical sequence is applied (when deriving representative numbers) for all compared (matrix type) variables.

The system can also determine (1420) if the position of the elements in the variable is important. For example, the positions are not important when working with sorted arrays (since positions of elements in sorted arrays are known already) and the positions are not important when working with a logical condition where the pair [2,3] is considered as being equal to the pair [3,2]. In other cases, the positions are important, e.g., when the pair [2,3] is not considered as being equal to the pair [3,2]. If position is not important, each representative number from each respective summation of the member numbers of the mathematical sequence is ready to use as is. But if the position of the elements in the variable is important, position variables are computed (1425) for pairs of elements in the two-element pairs of the variable. The computing (1425) of each position variable for a pair of elements can involve exponentiation of negative 1 by a result of the Boolean condition Y>X, where X is the first element in the pair of elements, and Y is the second element in the pair of elements. Thus, if Y>X, the position variable is negative 1, and if Y<X, the position variable is positive 1. Moreover, note that the reverse Boolean condition can also be used in some implementations.

For compared variables where positions of elements are important, the representative numbers are further formed by multiplying (1430) each sum of the members of the mathematical sequence by the position variable for the corresponding pair of elements in the two-element pairs of the variable. Thus, with F(n) as the function of determining the number by its index in a selected mathematical sequence (with an increasing difference between the members of the sequence), x can be a first number, y can be a second number, and z can be a unique number (a representative number) formed therefrom. The formula where the position of elements in the pair is important is:

$$Z = \left((-1)^{\wedge condition(y>x)}\right) * F(x) + F(y)$$

OR $$Z = \begin{cases} F(x) + F(y) & \text{if } (x \geq y) \\ -F(x) + F(y)) & \text{if } (y > x) \end{cases}$$

The formula where the position of elements in the pair is not important is:

$$Z = F(x) + F(y)$$

Note that mathematical sequences with an increasing difference between the members of these sequences are sequences where $|a_{(i+1)} - a_{(i)}| > |a_{(i)} - a_{(i-1)}|$, for example, a geometric sequence, an exponential sequence, etc. Where $a_n$ is the member of the sequence with index (position) in sequence equal to n. Also, the Fibonacci sequence receives this property, starting with the third member of the progression.

Further, the representative numbers are stored (1435) in a smaller (reduced-sized) version of the variable for use in evaluating the Boolean condition between original variables A and B, or for use in further reduction in the size of the variables before evaluation of the Boolean condition between original variables A and B. For example, the representative number of each new pair can be added to a new array that is the smaller (reduced-sized) version of a prior array. Note that the representative numbers should be stored (1435) in the smaller version of the variable, along with any single element removed (1405) from the initial variable, in the same order for all compared variables.

The system can determine (1440) whether further reduction in size is desired for the variable. For example, further reduction is not needed when doing so will not improve efficiency in view of (1) the amount of time spent performing the additional size reduction (the greater the number of elements in the variable and the number of compared variables, the greater the time advantage of the reduction than the usual comparison) and/or (2) the amount of memory consumed (due to the high growth of progressions, the values of elements in the reduced variable will grow, in the absence of support for long arithmetic, also to save memory, systems can round the values of elements, which can lead to collisions on very large or small numbers) versus the traditional comparison (of each respective number or character in the same place in matrix type variables A and B). Thus, if further reduction is not desired, the process of FIG. 14 ends. If further reduction is desired, the process of FIG. 14 repeats to reduce the size of the variable again.

Note that the process of FIG. 14 is performed for both variables A and B (having matrix type data) to be compared in the Boolean condition. The data values of the elements of the variables being reduced in size using the process of FIG. 14 can be numbers and/or characters, and the result of this reduction in the size of the variables A and B is that the efficiency of the transformation of the Boolean condition into the arithmetic and/or bitwise expression of the Boolean condition is improved.

Further, as noted above, the positions of the elements in matrix type variables to be compared is not important when working with sorted arrays. In view of this, in some implementations, each of the matrix type variables (arrays, lists, vectors, etc.) to be compared is sorted so as to avoid one or more portions (or all) of the determining (1420), the computing (1425) and the multiplying (1430) operations. In combination with transforming the Boolean condition into the arithmetic and/or bitwise expression of the Boolean condition, the following sorting technique can provide improved efficiency. For example, rather than sorting a whole array on a single thread using modern sorting techniques (e.g., quicksort or qsort, bubble sort, selection sort, insertion sort, etc.), the array can be split into a number of smaller subarrays corresponding the number of available threads, where each smaller subarray processing can be executed in parallel by a separate thread and where a (searched) position index of each element in an original array is determined by comparing the value of each element with the other elements of the initial array.

Figure 15:
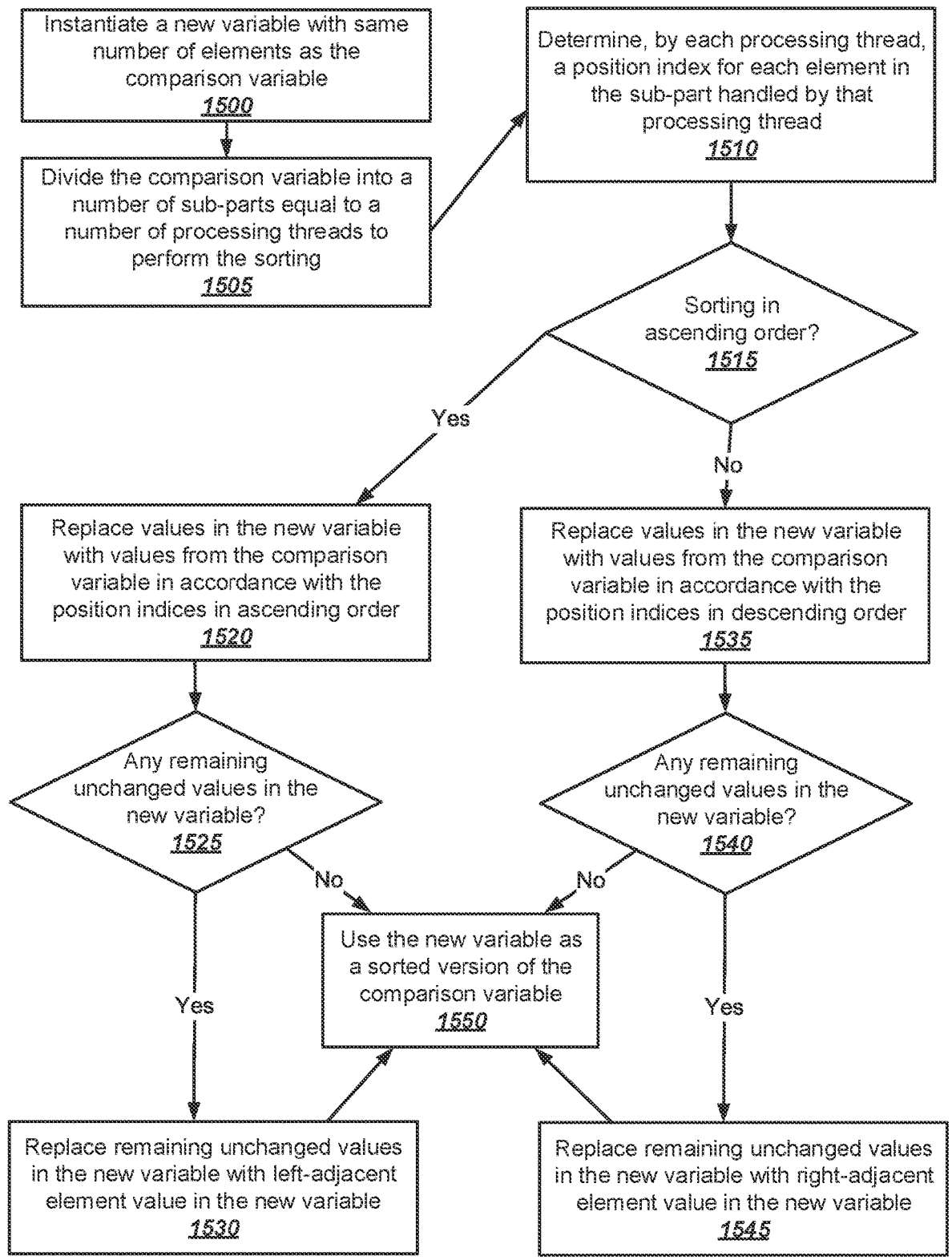
FIG. 15 is a flowchart of an example process for parallel sorting of matrix type data.

FIG. 15 is a flowchart of an example process for parallel sorting of matrix type data, e.g., which is to be compared, as can be used in combination with transforming the Boolean condition into the arithmetic and/or bitwise expression of the Boolean condition. The process can be implemented by one or more computer programs installed on one or more computers in one or more locations and programmed in accordance with this specification. For example, the process can be performed by the system 100 shown in FIG. 1. For convenience, the process will be described as being performed by a system of one or more computers, but it should be noted that the process of FIG. 15 can be part of the pre-processing of the computer program to do the transformation and so it need not be performed on the same computer system that executes the transformed computer program. In any case, this parallel sorting scheme can improve the total computational efficiency of the processing operations.

Based on an initial (chosen for sorting) matrix-type-data variable, the system can instantiate (1500) a new variable with a same number of elements as the matrix-type-data variable. For example, a new array with the same quantity of elements as in the initial (to be sorted) array can be created and all element positions in the new array can be filled with null values. The system allocates necessary memory volume to store the new variable.

The matrix-type-data variable is divided (1505) by the system into a number of sub-parts equal to a number of processing threads to be used to perform the sorting. For example, the initial (to be sorted) array can be split into number of subarrays equal to the number of threads allocated for the sorting task. Note that the sub-parts of the matrix-type-data variable need not be equal in dimension(s).

Each of the respective processing threads in the system determines (1510) a position index for each element in the sub-part handled by that processing thread. This can involve comparing a value of each element of the sub-part with all other values in the matrix-type-data variable and counting how many of the elements of the matrix-type-data variable are less than (or are greater than for an inversed position index) the compared element of the sub-part. For example, on the level of each thread, the system can determine the position index for each element of each subarray in the sorted array by comparing the value of each element of the subarray with values of the rest of the elements in the initial array and counting the number of elements of the initial array that are more (or less) in value than the compared element.

When counting the number of elements that are less in value than the compared element, the resulting count is the position index, i.e., a count of zero indicates no other values in the matrix-type-data variable are less than the compared value in the sub-part of the variable, so this compared value goes first in the sorted variable (when sorting in ascending order). In contrast, when counting the number of elements that are greater in value than the compared element, the resulting count is the inverse position index, i.e., a count of zero indicates no other values in the matrix-type-data variable are greater than the compared value in the sub-part of the variable, so this compared value goes last in the sorted variable (when sorting in ascending order).

In some implementations, the system determines (1515) whether the sorting is being done in ascending order versus descending order. In other implementations, the sorting is always done in one order or the other, and so no determination (1515) is needed by the system.

When sorting in ascending order, the system replaces (1520) values in the new variable with values from the matrix-type-data variable in accordance with the position indices determined by the processing threads, in ascending order. Thus, for a regular position index (when the counting was of the number of elements that are less) the value in the matrix-type-data variable having position index zero goes in the first position in the new variable, the value in the matrix-type-data variable having position index one goes in the second position in the new variable, the value in the matrix-type-data variable having position index two goes in the third position in the new variable, and so on. For example, the results of the position index counting on the level of subarrays in the initial array can be combined in the new array by replacing the null values in the new array by respective values from the initial array with the same position index in ascending order.

The system then checks (1525) to see if there are any remaining unchanged values in the new variable. For example, the system can check whether or not there are still elements in the new array with the null value as a result of the presence of equal value elements in the initial array. In the case where there are no null-value elements in the new array at this stage, the new array can be considered an equivalent of the sorted (initial) array. Note that each element in the initial variable with a value that is equal to the value in another element of the initial variable will get the same position index as that other element, and so one or more of the elements in the new variable will remain unchanged after the replacing (1520) when there are equal values in the initial variable.

When this occurs, the system replaces (1530) any remaining unchanged values in the new variable with a left-adjacent element value in the new variable. For example, all remaining elements with null values in the new array can be replaced by the first (no-null) value element found to the left from null value elements, after which the new array can be considered an equivalent of the sorted (initial) array. These replacements are done as many times as needed, in view of the number of equal values in the elements of the initial matrix-type-data variable.

Likewise, when sorting in descending order, the system replaces (1535) values in the new variable with values from the matrix-type-data variable in accordance with the position indices determined by the processing threads, in descending order. Thus, for an inverse position index (when the counting was of the number of elements that are greater) the value in the matrix-type-data variable having position index zero goes in the first position in the new variable, the value in the matrix-type-data variable having position index one goes in the second position in the new variable, the value in the matrix-type-data variable having position index two goes in the third position in the new variable, and so on. For example, the results of the position index counting on the level of subarrays in the initial array can be combined in the new array by replacing the null values in the new array by respective values from the initial array with the same position index in descending order.

The system then checks (1540) to see if there are any remaining unchanged values in the new variable. For example, the system can check whether or not there are still elements in the new array with the null value as a result of the presence of equal value elements in the initial array. In the case where there are no null-value elements in the new array at this stage, the new array can be considered an equivalent of the sorted (initial) array. Note that each element in the initial variable with a value that is equal to the value in another element of the initial variable will get the same position index as that other element, and so one or more of the elements in the new variable will remain unchanged after the replacing (1535) when there are equal values in the initial variable.

When this occurs, the system replaces (1545) any remaining unchanged values in the new variable with a right-adjacent element value in the new variable. For example, all remaining elements with null values in the new array can be replaced by the first (no-null) value element found to the right from null value elements, after which the new array can be considered an equivalent of the sorted (initial) array. This is done as many times as needed, in view of the number of equal values in the elements of the initial matrix-type-data variable.

Finally, the system uses (1550) the new variable as a sorted version of the matrix-type-data variable. In some cases, this is done by using the new variable instead of the initial matrix-type-data variable in the process of FIG. 14. In some cases, this is done by overwriting the values in the initial matrix-type-data variable with the sorted values in the new variable, and the now sorted matrix-type-data variable is used in the process of FIG. 14.

In addition, it should be noted that the parallel sorting process of FIG. 15 can be used efficiently in contexts other than the matrix optimization (for comparing matrix type data) process of FIG. 14. For example, the parallel sorting process of FIG. 15 can also be used in the context of efficient sorting of matrix type data (without need of further matrix optimization and comparison) such as to optimize a standard sorting for a wide variety of tasks using the methods of transforming a Boolean condition to an arithmetic and/or bitwise expression of the Boolean condition, as described in this application.

In some implementations, a method of sorting a matrix-type-data object can include: instantiating a new object with a same number of elements as the matrix-type-data object; dividing the matrix-type-data object into a number of sub-parts equal to a number of processing threads to be used to perform the sorting; determining, by each of the respective processing threads, a position index for each element in the sub-part handled by the processing thread by comparing a value of each element of the sub-part with all other values in the matrix-type-data object and counting how many of the elements of the matrix-type-data object are less than, or are greater than for an inversed position index, the compared element of the sub-part; replacing values in the new object with values from the matrix-type-data object in accordance with the position indices determined by the processing threads, in either ascending or descending order; and replacing any remaining unchanged values in the new object with either a left-adjacent element value or a right-adjacent element value in the new object, depending on whether the sorting is in ascending or descending order, wherein the new object is used as a sorted version of the matrix-type-data object. Note that the determining of the position indices by comparing values can employ the systems and techniques described in connection with FIGS. 1-13 for transforming a Boolean condition into an arithmetic and/or bitwise expression of the Boolean condition, which results in increased efficiency of processing operations.

Further, it should be noted that the optimization of the process of comparing matrix type data (or objects) of FIG. 14 can be used efficiently in contexts other than transforming a Boolean condition into an arithmetic and/or bitwise expression of the Boolean condition. For example, this matrix variable optimization process can also be used in the context of a comparison without converting a Boolean condition to an arithmetic and/or bitwise expression, such as to optimize a standard comparison. Moreover, the optimization process of FIG. 14 can be used independently from a comparison process. For example, the optimization process of FIG. 14 can be used for compression of a matrix into a smaller size matrix for efficient storage (lesser memory required).

In some implementations, the matrix variable optimization process of FIG. 14 is used to increase the efficiency of matrix type object comparisons more generally. Thus, a method (in accordance with some embodiments) can include: accessing a computer program comprising a conditional statement comprising a Boolean condition that compares a first variable A and a second variable B, wherein each of the first and second variables A and B comprises matrix type data; splitting each of the first and second variables A and B into respective first two-element pairs of the first variable A and second two-element pairs of the second variable B; and forming smaller versions of each of the first and second variables A and B, for comparison, using representative numbers from a mathematical sequence with an increasing difference between members of the mathematical sequence, wherein each of the representative numbers for the smaller version of the first variable A is computed from respective members of the mathematical sequence having indexes in the mathematical sequence that are equal to data values in the first two-element pairs of the first variable A, each of the representative numbers for the smaller version of the second variable B is computed from respective members of the mathematical sequence having indexes in the mathematical sequence that are equal to data values in the second two-element pairs of the second variable B, and wherein, when each of the first and second variables A and B have an odd number of elements, removing a single element from each of the first and second variables A and B before the splitting, and adding the single element from each of the first and second variables A and B to the smaller versions of the first and second variables A and B respectively. Further, this method includes comparing the smaller versions of the first and second variables A and B to evaluate the Boolean condition of the conditional statement when running the computer program.

In some embodiments, the forming operation of the above method includes: computing the representative numbers for the smaller version of the first variable A by summing, for each element of the smaller version of the first variable A, two of the respective members of the mathematical sequence that correspond to the data values in the first two-element pairs of the first variable A; and computing the representative numbers for the smaller version of the second variable B by summing, for each element of the smaller version of the second variable B, two of the respective members of the mathematical sequence that correspond to the data values in the second two-element pairs of the second variable B.

In some embodiments, the above method includes: computing first position variables for the first two-element pairs of the first variable A; and computing second position variables for the second two-element pairs of the second variable B; wherein computing each position variable for a pair of elements comprises exponentiation of a number, which is equal to negative 1, by a result of Boolean condition Y>X, wherein X is the first element in the pair of elements, and Y is the second element in the pair of elements; and wherein the forming comprises computing the representative numbers for the smaller version of the first variable A by, for each element of the smaller version of the first variable A, multiplying one of the first position variables by a sum of two of the respective members of the mathematical sequence that correspond to the data values in the first two-element pairs of the first variable A, and computing the representative numbers for the smaller version of the second variable B by, for each element of the smaller version of the second variable B, multiplying one of the second position variables by a sum of two of the respective members of the mathematical sequence that correspond to the data values in the second two-element pairs of the second variable B.

In some implementations, the same (identical) steps, orders, instruments (e.g., mathematical progression sequences) are applied for all compared (matrix type) variables. Moreover, one or more of the systems described in this document can be used in one or more embodiments in which one or more memory units are configured to cause one or more instruction processing units to perform the operations of the above method(s). These systems and methods for matrix type object comparisons result in improved processing speed, as matrix type data can be compared more quickly on a particular computer (having a given processing power) than was possible before on that particular computer. Also, these systems and methods for matrix type object comparisons can result in less memory consumption since the smaller version of a variable can require less memory than the initial variable.

Some embodiments include a method comprising: accessing a computer program, wherein the computer program comprises a conditional statement that comprises a Boolean condition; transforming the Boolean condition into an arithmetic and/or bitwise expression of the Boolean condition; generating an arithmetic and/or bitwise expression of the computer program comprising the arithmetic and/or bitwise expression of the Boolean condition in place of the Boolean condition; and providing the arithmetic and/or bitwise expression of the computer program, wherein the arithmetic and/or bitwise expression of the computer program is configured to be executed by an arithmetic and/or bitwise operation unit of a processor. The arithmetic and/or bitwise expression of the Boolean condition can verify the following: if the Boolean condition is verified, the arithmetic and/or bitwise expression of the Boolean condition is equal to 1; and if the Boolean condition is not verified, the arithmetic and/or bitwise expression of the Boolean condition is equal to 0.

In some embodiments of the above method, the Boolean condition takes a first variable A and a second variable B, and transforming the Boolean condition into an arithmetic and/or bitwise expression of the Boolean condition comprises: subtracting B from A; computing an absolute value of a result of the subtracting B from A; computing an exponent based on the absolute value of a result of the subtracting B from A; computing an exponential by exponentiation of a base number by the computed exponent; and computing the arithmetic and/or bitwise expression of the Boolean condition based on a remainder of a division of the exponential by the base number. The Boolean condition can be A=B, and transforming the Boolean condition into an arithmetic and/or bitwise expression of the Boolean condition can comprise: computing the exponent as the absolute value of the result of the subtracting B from A; and computing the arithmetic and/or bitwise expression of the Boolean condition as the remainder of the division of the exponential by the base number.

The Boolean condition can be A≥B, and transforming the Boolean condition into an arithmetic and/or bitwise expression of the Boolean condition can comprise: subtracting the result of the subtracting B from A from the absolute value of the result of the subtracting B from A; computing the exponent as an absolute value of a result of the subtracting the result of the subtracting B from A from the absolute value of the result of the subtracting B from A; and computing the arithmetic and/or bitwise expression of the Boolean condition as the remainder of the division of the exponential by the base number.

The Boolean condition can be A<B, and transforming the Boolean condition into an arithmetic and/or bitwise expression of the Boolean condition can comprise: subtracting the result of the subtracting B from A from the absolute value of the result of the subtracting B from A; computing the exponent as an absolute value of a result of the subtracting the result of the subtracting B from A from the absolute value of the result of the subtracting B from A; computing the exponential by exponentiation of the base number by the exponent; and computing the arithmetic and/or bitwise expression of the Boolean condition as 1 minus the remainder of division of the exponential by the base number.

The first and second variables A and B can be floating point type data. In some embodiments, the Boolean condition is A=B, the first and second variables A and B are floating point type data, and transforming the Boolean condition into an arithmetic and/or bitwise expression of the Boolean condition comprises: computing the exponent as a result of a ceiling function applied to the absolute value of the result of the subtracting B from A; and computing the arithmetic and/or bitwise expression of the Boolean condition as the remainder of the division of the exponential by the base number. In some embodiments, the Boolean condition is A≥B, the first and second variables A and B are floating point type data, and transforming the Boolean condition into an arithmetic and/or bitwise expression of the Boolean condition comprises: subtracting the result of the subtracting B from A from the absolute value of the result of the subtracting B from A; computing the exponent as a result of a ceiling function applied to an absolute value of a result of the subtracting the result of the subtracting B from A from the absolute value of the result of the subtracting B from A; and computing the arithmetic and/or bitwise expression of the Boolean condition as the remainder of the division of the exponential by the base number. In some embodiments, the Boolean condition is A<B, the first and second variables A and B are floating point type data, and transforming the Boolean condition into an arithmetic and/or bitwise expression of the Boolean condition comprises: subtracting the result of the subtracting B from A from the absolute value of the result of the subtracting B from A; computing the exponent as a result of a ceiling function applied to an absolute value of a result of the subtracting the result of the subtracting B from A from the absolute value of the result of the subtracting B from A; computing the exponential by exponentiation of the base number by the exponent; and computing the arithmetic and/or bitwise expression of the Boolean condition as 1 minus the remainder of division of the exponential by the base number.

In some embodiments, the first and second variables A and B can be Boolean type data (0 and 1), the Boolean condition can be A=B, and transforming the Boolean condition into an arithmetic and/or bitwise expression of the Boolean condition can comprise: computing a sum of A and B; and computing the arithmetic and/or bitwise expression of the Boolean condition as 1 minus a remainder of division of the sum by the base number.

In some embodiments, the first and second variables A and B can comprise matrix type data, and the method can comprise: splitting each of the first and second variables A and B into respective first two-element pairs of the first variable A and second two-element pairs of the second variable B; and forming smaller versions of each of the first and second variables A and B, for comparison, using representative numbers from a mathematical sequence with an increasing difference between members of the mathematical sequence; wherein each of the representative numbers for the smaller version of the first variable A is computed from respective members of the mathematical sequence having indexes in the mathematical sequence that are equal to data values in the first two-element pairs of the first variable A; wherein each of the representative numbers for the smaller version of the second variable B is computed from respective members of the mathematical sequence having indexes in the mathematical sequence that are equal to data values in the second two-element pairs of the second variable B; and wherein, when each of the first and second variables A and B have an odd number of elements, removing a single element from each of the first and second variables A and B before the splitting, and adding the single element from each of the first and second variables A and B to the smaller versions of the first and second variables A and B respectively.

The forming can comprise: computing the representative numbers for the smaller version of the first variable A by summing, for each element of the smaller version of the first variable A, two of the respective members of the mathematical sequence that correspond to the data values in the first two-element pairs of the first variable A; and computing the representative numbers for the smaller version of the second variable B by summing, for each element of the smaller version of the second variable B, two of the respective members of the mathematical sequence that correspond to the data values in the second two-element pairs of the second variable B.

The above method can also comprise: sorting each of the first and second variables A and B, wherein the sorting of a matrix-type-data variable comprises: instantiating a new variable with a same number of elements as the matrix-type-data variable; dividing the matrix-type-data variable into a number of sub-parts equal to a number of processing threads to be used to perform the sorting; determining, by each of the respective processing threads, a position index for each element in the sub-part handled by the processing thread by comparing a value of each element of the sub-part with all other values in the matrix-type-data variable and counting how many of the elements of the matrix-type-data variable are less than, or are greater than for an inversed position index, the compared element of the sub-part; replacing values in the new variable with values from the matrix-type-data variable in accordance with the position indices determined by the processing threads, in either ascending or descending order; and replacing any remaining unchanged values in the new variable with either a left-adjacent element value or a right-adjacent element value in the new variable, depending on whether the sorting is in ascending or descending order; wherein the new variable is used as a sorted version of the matrix-type-data variable.

The above method can also comprise: computing first position variables for the first two-element pairs of the first variable A; and computing second position variables for the second two-element pairs of the second variable B; wherein computing each position variable for a pair of elements comprises exponentiation of a number, which is equal to negative 1, by a result of Boolean condition Y>X, wherein X is the first element in the pair of elements, and Y is the second element in the pair of elements; and wherein the forming comprises computing the representative numbers for the smaller version of the first variable A by, for each element of the smaller version of the first variable A, multiplying one of the first position variables by a sum of two of the respective members of the mathematical sequence that correspond to the data values in the first two-element pairs of the first variable A, and computing the representative numbers for the smaller version of the second variable B by, for each element of the smaller version of the second variable B, multiplying one of the second position variables by a sum of two of the respective members of the mathematical sequence that correspond to the data values in the second two-element pairs of the second variable B.

In the above embodiments, the base number can be equal to 2, wherein the processor uses a binary system, and wherein the remainder of division of the exponential by the base number is extracted by taking a last bit of the exponential. Further, when the processor uses a binary system, the exponentiation of the base number by the computed exponent can be performed by shifting a bit, which is equal to 1, left by a number of places equal to the computed exponent.

The Boolean condition can be A<B, and transforming the Boolean condition into an arithmetic and/or bitwise expression of the Boolean condition can comprise: subtracting B from A; computing the arithmetic and/or bitwise expression of the Boolean condition as a borrow value of a result of the subtracting B from A.

Providing the arithmetic and/or bitwise expression of the computer program can comprise: fragmenting the arithmetic and/or bitwise expression of the computer program into multiple fragments of arithmetic and/or bitwise expression; and the fragments of arithmetic and/or bitwise expression can be configured to be executed in parallel.

The Boolean condition can comprise a consequent task that is formulated as an arithmetic statement, and generating the arithmetic and/or bitwise expression of the computer program can comprise: multiplying the consequent task with the arithmetic and/or bitwise expression of the Boolean condition. The Boolean condition can comprise an alternative task that is formulated as an arithmetic statement, and generating the arithmetic and/or bitwise expression of the computer program can comprise: multiplying the alternative task with a 1 minus the arithmetic and/or bitwise expression of the Boolean condition.

The Boolean condition can comprise a consequent task that is formulated as a non-arithmetic statement, and generating the arithmetic and/or bitwise expression of the computer program can comprise: including in the arithmetic and/or bitwise expression of the computer program an unconditional jump to a label associated with the arithmetic and/or bitwise expression of the Boolean condition. Also, the label can be equal to a start of a statement of the consequent task when a value of the arithmetic and/or bitwise expression of the Boolean condition is equal to 1. Moreover, the Boolean condition can comprise an alternative task that is formulated as a non-arithmetic statement, wherein the label is equal to a start of a statement of the alternative task when the value of the arithmetic and/or bitwise expression of the Boolean condition is equal to 0.

In some embodiments, the method further comprises: executing, by the arithmetic and/or bitwise operation unit, the arithmetic and/or bitwise expression of the computer program. In some embodiments, at least the transforming is performed by a first computer, and the executing is performed by a second computer. In some embodiments, the transforming and the executing are performed by a same computer.

Some embodiments include a system comprising: one or more instruction processing units comprising at least one control unit, at least one arithmetic and/or bitwise operation unit, and at least one register unit; and one or more memory units coupled with the one or more instruction processing units; wherein the system is configured to perform substantially all conditional statements, which each comprise a Boolean condition, in a computer program by using the at least one arithmetic and/or bitwise operation unit to execute arithmetic and/or bitwise expressions of the Boolean conditions of the substantially all conditional statements. In such system embodiments, the at least one control unit or a separate data processing apparatus of the system can be configured to perform method operations of any of the above method embodiments, and the at least one arithmetic and/or bitwise operation unit of the processor can comprise the one or more instruction processing units being configured to execute the arithmetic and/or bitwise expression of the computer program. Moreover, the at least one arithmetic and/or bitwise operation unit can comprise one or more of an arithmetic block, a bitwise shift block, and a bitwise logical block, and the at least one arithmetic and/or bitwise operation unit need not include any digital comparator.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. For example, operations 1420 and 1425 need not follow operation 1415 in FIG. 14; in some implementations operations 1420 and 1425 are performed before operation 1415. Furthermore, in some cases, multitasking and parallel processing may be advantageous.

What is claimed is:

1. A system comprising:
one or more instruction processing units comprising at least one control unit, at least one arithmetic and/or bitwise operation unit, and at least one register unit; and
one or more memory units coupled with the one or more instruction processing units;
wherein the system is configured to perform conditional statements, which each comprise a Boolean condition, in a computer program by using the at least one arithmetic and/or bitwise operation unit to execute arithmetic and/or bitwise expressions of the Boolean conditions of the conditional statements, wherein the at least one arithmetic and/or bitwise operation unit comprises one or more of an arithmetic block, a bitwise shift block, and a bitwise logical block, and wherein the at least one arithmetic and/or bitwise operation unit does not include any digital comparator.

2. The system of claim 1, wherein the control unit or a separate data processing apparatus of the system is configured to perform operations comprising:
accessing a computer program, wherein the computer program comprises a conditional statement that comprises a Boolean condition;
transforming the Boolean condition into an arithmetic and/or bitwise expression of the Boolean condition;
generating an arithmetic and/or bitwise expression of the computer program comprising the arithmetic and/or bitwise expression of the Boolean condition in place of the Boolean condition; and
providing the arithmetic and/or bitwise expression of the computer program to the arithmetic and/or bitwise operation unit; and
wherein the arithmetic and/or bitwise operation unit is configured to execute the arithmetic and/or bitwise expression of the computer program.

3. A method comprising:
accessing a computer program comprising a conditional statement comprising a Boolean condition that compares a first variable A and a second variable B, wherein each of the first and second variables A and B comprises matrix-type data;
splitting each of the first and second variables A and B into respective first two-element pairs of the first variable A and second two-element pairs of the second variable B;
forming smaller versions of each of the first and second variables A and B, for comparison, using representative numbers from a mathematical sequence with an increasing difference between members of the mathematical sequence,
wherein each of the representative numbers for the smaller version of the first variable A is computed from respective members of the mathematical sequence having indexes in the mathematical sequence that are equal to data values in the first two-element pairs of the first variable A,
wherein each of the representative numbers for the smaller version of the second variable B is computed from respective members of the mathematical sequence having indexes in the mathematical sequence that are equal to data values in the second two-element pairs of the second variable B, and
wherein, when each of the first and second variables A and B have an odd number of elements,
removing a single element from each of the first and second variables A and B before the splitting, and
adding the single element from each of the first and second variables A and B to the smaller versions of the first and second variables A and B respectively; and
comparing the smaller versions of the first and second variables A and B to evaluate the Boolean condition of the conditional statement by running the computer program; wherein the first and second variables A and B are data objects stored in a non-transitory random or serial access memory device.

4. The method of claim 3, wherein the data objects comprise arrays, lists, or vectors, and the method comprises:
transforming the Boolean condition into an arithmetic and/or bitwise expression of the Boolean condition using the smaller versions of the first and second variables A and B;
generating an arithmetic and/or bitwise expression of the computer program comprising the arithmetic and/or bitwise expression of the Boolean condition in place of the Boolean condition; and
providing the arithmetic and/or bitwise expression of the computer program, wherein the arithmetic and/or bitwise expression of the computer program is configured to be executed by an arithmetic and/or bitwise operation unit of a processor to cause the comparing.

5. The method of claim 4, wherein transforming the Boolean condition into the arithmetic and/or bitwise expression of the Boolean condition using the smaller versions of the first and second variables A and B comprises:
applying a transformation formula selected in accordance with (i) a data type of the smaller versions of the first and second variables A and B and (ii) a comparison type of the Boolean condition.

6. The method of claim 4, wherein the method further comprises:
executing, by the arithmetic and/or bitwise operation unit, the arithmetic and/or bitwise expression of the computer program.

7. The method of claim 6, wherein at least the transforming is performed by a first computer, and the executing is performed by a second computer.

8. The method of claim 6, wherein the transforming and the executing are performed by a same computer.

9. The method of claim 4, wherein transforming the Boolean condition into the arithmetic and/or bitwise expression of the Boolean condition comprises:
subtracting an element B[i] of the smaller version of the second variable B from an element A[i] of the smaller version of the first variable A;
computing an absolute value of a result of the subtracting;
computing an exponent based on the absolute value of a result of the subtracting;
computing an exponential by exponentiation of a base number by the computed exponent; and
computing the arithmetic and/or bitwise expression of the Boolean condition based on a remainder of a division of the exponential by the base number.

10. The method of claim 9, wherein the Boolean condition is A=B, and wherein transforming the Boolean condition into the arithmetic and/or bitwise expression of the Boolean condition comprises:
  computing the exponent as the absolute value of the result of the subtracting; and
  computing the arithmetic and/or bitwise expression of the Boolean condition as the remainder of the division of the exponential by the base number.

11. The method of claim 9, wherein the Boolean condition is A≥B, and wherein transforming the Boolean condition into the arithmetic and/or bitwise expression of the Boolean condition comprises:
  subtracting the result of the subtracting of the element B[i] of the smaller version of the second variable B from the element A[i] of the smaller version of the first variable A from the absolute value of the result of the subtracting the element B[i] from the element A[i];
  computing the exponent as an absolute value of a result of the subtracting the result from the absolute value; and
  computing the arithmetic and/or bitwise expression of the Boolean condition as the remainder of the division of the exponential by the base number.

12. The method of claim 9, wherein the Boolean condition is A<B, and wherein transforming the Boolean condition into the arithmetic and/or bitwise expression of the Boolean condition comprises:
  subtracting the result of the subtracting of the element B[i] of the smaller version of the second variable B from the element A[i] of the smaller version of the first variable A from the absolute value of the result of the subtracting the element B[i] from the element A[i];
  computing the exponent as an absolute value of a result of the subtracting the result from the absolute value;
  computing the exponential by exponentiation of the base number by the exponent; and
  computing the arithmetic and/or bitwise expression of the Boolean condition as 1 minus the remainder of division of the exponential by the base number.

13. The method of claim 9, wherein the Boolean condition is A<B, and wherein transforming the Boolean condition into the arithmetic and/or bitwise expression of the Boolean condition comprises:
  subtracting the element B[i] of the smaller version of the second variable B from the element A[i] of the smaller version of the first variable A; and
  computing the arithmetic and/or bitwise expression of the Boolean condition as a borrow value of a result of the subtracting the element B[i] from the element A[i].

14. The method of claim 9, wherein the base number is equal to 2, and wherein the processor uses a binary system, and wherein the remainder of division of the exponential by the base number is extracted by taking a last bit of the exponential.

15. The method of claim 9, wherein the processor uses a binary system, and wherein the exponentiation of the base number by the computed exponent is performed by shifting a bit, which is equal to 1, left by a number of places equal to the computed exponent.

16. The method of claim 9, wherein the Boolean condition is A=B, wherein the first and second variables A and B are floating point type data, and wherein transforming the Boolean condition into the arithmetic and/or bitwise expression of the Boolean condition comprises:
  computing the exponent as a result of a ceiling function applied to the absolute value of the result of the subtracting the element B[i] of the smaller version of the second variable B from the element A[i] of the smaller version of the first variable A; and
  computing the arithmetic and/or bitwise expression of the Boolean condition as the remainder of the division of the exponential by the base number.

17. The method of claim 9, wherein the Boolean condition is A≥B, wherein the first and second variables A and B are floating point type data, and wherein transforming the Boolean condition into the arithmetic and/or bitwise expression of the Boolean condition comprises:
  subtracting the result of the subtracting the element B[i] of the smaller version of the second variable B from the element A[i] of the smaller version of the first variable A from the absolute value of the result of the subtracting the element B[i] from the element A[i];
  computing the exponent as a result of a ceiling function applied to an absolute value of a result of the subtracting the result of the subtracting the element B[i] from the element A[i] from the absolute value of the result of the subtracting the element B[i] from the element A[i]; and
  computing the arithmetic and/or bitwise expression of the Boolean condition as the remainder of the division of the exponential by the base number.

18. The method of claim 9, wherein the Boolean condition is A<B, wherein the first and second variables A and B are floating point type data, and wherein transforming the Boolean condition into the arithmetic and/or bitwise expression of the Boolean condition comprises:
  subtracting the result of the subtracting the element B[i] of the smaller version of the second variable B from the element A[i] of the smaller version of the first variable A from the absolute value of the result of the subtracting the element B[i] from the element A[i];
  computing the exponent as a result of a ceiling function applied to an absolute value of a result of the subtracting the result of the subtracting the element B[i] from the element A[i] from the absolute value of the result of the subtracting the element B[i] from the element A[i];
  computing the exponential by exponentiation of the base number by the exponent; and
  computing the arithmetic and/or bitwise expression of the Boolean condition as 1 minus the remainder of division of the exponential by the base number.

19. The method of claim 9, wherein the first and second variables A and B are Boolean type data, wherein the Boolean condition is A=B, and wherein transforming the Boolean condition into the arithmetic and/or bitwise expression of the Boolean condition comprises:
  computing a sum of the element A[i] of the smaller version of the first variable A and the element B[i] of the smaller version of the second variable B; and
  computing the arithmetic and/or bitwise expression of the Boolean condition as 1 minus a remainder of division of the sum by the base number.

20. The method of claim 4, wherein providing the arithmetic and/or bitwise expression of the computer program comprises:
  fragmenting the arithmetic and/or bitwise expression of the computer program into multiple fragments of arithmetic and/or bitwise expression; and
  wherein the fragments of arithmetic and/or bitwise expression are configured to be executed in parallel.

21. The method of claim 4, wherein the arithmetic and/or bitwise expression of the Boolean condition verifies the following:

if the Boolean condition is verified, the arithmetic and/or bitwise expression of the Boolean condition is equal to 1; and if the Boolean condition is not verified, the arithmetic and/or bitwise expression of the Boolean condition is equal to 0.

22. The method of claim 21, wherein the Boolean condition comprises a consequent task that is formulated as an arithmetic statement, and wherein generating the arithmetic and/or bitwise expression of the computer program comprises:

multiplying the consequent task with the arithmetic and/or bitwise expression of the Boolean condition.

23. The method of claim 22, wherein the Boolean condition comprises an alternative task that is formulated as an arithmetic statement, and wherein generating the arithmetic and/or bitwise expression of the computer program comprises:

multiplying the alternative task with a 1 minus the arithmetic and/or bitwise expression of the Boolean condition.

24. The method of claim 21, wherein the Boolean condition comprises a consequent task that is formulated as a non-arithmetic statement, and wherein generating the arithmetic and/or bitwise expression of the computer program comprises:

including in the arithmetic and/or bitwise expression of the computer program an unconditional jump to a label associated with the arithmetic and/or bitwise expression of the Boolean condition.

25. The method of claim 24, wherein the label is equal to a start of a statement of the consequent task when the value of the arithmetic and/or bitwise expression of the Boolean condition is equal to 1.

26. The method of claim 25, wherein the Boolean condition comprises an alternative task that is formulated as a non-arithmetic statement, wherein the label is equal to a start of a statement of the alternative task when the value of the arithmetic and/or bitwise expression of the Boolean condition is equal to 0.

27. A system comprising:

one or more instruction processing units comprising at least one control unit, at least one arithmetic and/or bitwise operation unit, and at least one register unit; and one or more memory units coupled with the one or more instruction processing units;

wherein the one or more memory units are configured to cause the one or more instruction processing units to perform method operations of claim 4.

28. The method of claim 3, wherein the forming comprises:

computing the representative numbers for the smaller version of the first variable A by summing, for each element of the smaller version of the first variable A, two of the respective members of the mathematical sequence that correspond to the data values in the first two-element pairs of the first variable A; and computing the representative numbers for the smaller version of the second variable B by summing, for each element of the smaller version of the second variable B, two of the respective members of the mathematical sequence that correspond to the data values in the second two-element pairs of the second variable B.

29. The method of claim 3, comprising:

computing first position variables for the first two-element pairs of the first variable A; and computing second position variables for the second two-element pairs of the second variable B;

wherein computing each position variable for a pair of elements comprises exponentiation of a number, which is equal to negative 1, by a result of Boolean condition Y>X, wherein X is the first element in the pair of elements, and Y is the second element in the pair of elements; and wherein the forming comprises:

computing the representative numbers for the smaller version of the first variable A by, for each element of the smaller version of the first variable A, multiplying one of the first position variables by a sum of two of the respective members of the mathematical sequence that correspond to the data values in the first two-element pairs of the first variable A, and computing the representative numbers for the smaller version of the second variable B by, for each element of the smaller version of the second variable B, multiplying one of the second position variables by a sum of two of the respective members of the mathematical sequence that correspond to the data values in the second two-element pairs of the second variable B.

30. The method of claim 3, wherein the method further comprises:

sorting each respective one of the first and second variables A and B, comprising:

instantiating a new variable with a same number of elements as the respective variable;

dividing the respective variable into a number of sub-parts equal to a number of processing threads to be used to perform the sorting;

determining, by each of the respective processing threads, a position index for each element in the sub-part handled by the processing thread by comparing a value of each element of the sub-part with all other values in the respective variable and counting how many of the elements of the respective variable are less than, or are greater than for an inversed position index, the compared element of the sub-part;

replacing values in the new variable with values from the respective variable in accordance with the position indices determined by the processing threads, in either ascending or descending order; and replacing any remaining unchanged values in the new variable with either a left-adjacent element value or a right-adjacent element value in the new variable, depending on whether the sorting is in ascending or descending order;

wherein the new variable is used as a sorted version of the respective variable.

31. A method of sorting a matrix-type-data object, the method comprising:

instantiating a new object with a same number of elements as the matrix-type-data object;

dividing the matrix-type-data object into a number of sub-parts equal to a number of processing threads to be used to perform the sorting;

determining, by each of the respective processing threads, a position index for each element in the sub-part handled by the processing thread by comparing a value of each element of the sub-part with all other values in the matrix-type-data object and counting how many of the elements of the matrix-type-data object are less than, or are greater than for an inversed position index, the compared element of the sub-part;

replacing values in the new object with values from the matrix-type-data object in accordance with the position indices determined by the processing threads, in either ascending or descending order; and replacing any remaining unchanged values in the new object with either a left-adjacent element value or a right-adjacent element value in the new object, depending on whether the sorting is in ascending or descending order, wherein the new object is used as a sorted version of the matrix-type-data object.

32. A system comprising:

one or more instruction processing units comprising at least one control unit, at least one arithmetic and/or bitwise operation unit, and at least one register unit; and one or more memory units coupled with the one or more instruction processing units;

wherein the one or more memory units are configured to cause the one or more instruction processing units to perform method operations of claim 31.

33. One or more non-transitory computer storage media storing instructions that when executed by one or more computers cause the one or more computers to perform operations comprising:

accessing a computer program, wherein the computer program comprises a conditional statement that comprises a Boolean condition, wherein the Boolean condition compares a first variable A and a second variable B;

transforming the Boolean condition into an arithmetic and/or bitwise expression of the Boolean condition by applying a transformation formula selected in accordance with (i) a data type of the first variable A and the second variable B and (ii) a comparison type of the Boolean condition;

generating an arithmetic and/or bitwise expression of the computer program comprising the arithmetic and/or bitwise expression of the Boolean condition in place of the Boolean condition; and providing the arithmetic and/or bitwise expression of the computer program, wherein the arithmetic and/or bitwise expression of the computer program is configured to be executed by an arithmetic and/or bitwise operation unit of a processor;

wherein the operations are performed as a pre-processing step when compiling source code into executable code for a target machine, or wherein the operations are performed in an interpreter.

34. The one or more non-transitory computer storage media of claim 33, wherein the Boolean condition takes a first variable A and a second variable B, wherein transforming the Boolean condition into an arithmetic and/or bitwise expression of the Boolean condition comprises:

subtracting B from A;

computing an absolute value of a result of the subtracting B from A;

computing an exponent based on the absolute value of a result of the subtracting B from A;

computing an exponential by exponentiation of a base number by the computed exponent; and computing the arithmetic and/or bitwise expression of the Boolean condition based on a remainder of a division of the exponential by the base number.

35. The one or more non-transitory computer storage media of claim 34, wherein the Boolean condition is A=B, wherein the first and second variables A and B are floating point type data, and wherein transforming the Boolean condition into an arithmetic and/or bitwise expression of the Boolean condition comprises:

computing the exponent as a result of a ceiling function applied to the absolute value of the result of the subtracting B from A; and computing the arithmetic and/or bitwise expression of the Boolean condition as the remainder of the division of the exponential by the base number.

36. The one or more non-transitory computer storage media of claim 34, wherein the Boolean condition is A≥B, wherein the first and second variables A and B are floating point type data, and wherein transforming the Boolean condition into an arithmetic and/or bitwise expression of the Boolean condition comprises:

subtracting the result of the subtracting B from A from the absolute value of the result of the subtracting B from A;

computing the exponent as a result of a ceiling function applied to an absolute value of a result of the subtracting the result of the subtracting B from A from the absolute value of the result of the subtracting B from A; and computing the arithmetic and/or bitwise expression of the Boolean condition as the remainder of the division of the exponential by the base number.

37. The one or more non-transitory computer storage media of claim 34, wherein the Boolean condition is A<B, wherein the first and second variables A and B are floating point type data, and wherein transforming the Boolean condition into an arithmetic and/or bitwise expression of the Boolean condition comprises:

subtracting the result of the subtracting B from A from the absolute value of the result of the subtracting B from A;

computing the exponent as a result of a ceiling function applied to an absolute value of a result of the subtracting the result of the subtracting B from A from the absolute value of the result of the subtracting B from A;

computing the exponential by exponentiation of the base number by the exponent; and computing the arithmetic and/or bitwise expression of the Boolean condition as 1 minus the remainder of division of the exponential by the base number.

38. The one or more non-transitory computer storage media of claim 34, wherein the first and second variables A and B are Boolean type data, wherein the Boolean condition is A=B, and wherein transforming the Boolean condition into an arithmetic and/or bitwise expression of the Boolean condition comprises:

computing a sum of A and B; and computing the arithmetic and/or bitwise expression of the Boolean condition as 1 minus a remainder of division of the sum by the base number.

39. A method comprising:

accessing a computer program, wherein the computer program comprises a conditional statement that comprises a Boolean condition, wherein the Boolean condition compares a first variable A and a second variable B;

transforming the Boolean condition into an arithmetic and/or bitwise expression of the Boolean condition by applying a transformation formula selected in accordance with (i) a data type of the first variable A and the second variable B and (ii) a comparison type of the Boolean condition;

generating an arithmetic and/or bitwise expression of the computer program comprising the arithmetic and/or bitwise expression of the Boolean condition in place of the Boolean condition; and providing the arithmetic and/or bitwise expression of the computer program, wherein the arithmetic and/or bitwise expression of the computer program is configured to be executed by an arithmetic and/or bitwise operation unit of a processor;

wherein the operations are performed as a pre-processing step when compiling source code into executable code for a target machine, or wherein the operations are performed in an interpreter.

40. The method of claim 39, wherein the Boolean condition takes a first variable A and a second variable B, wherein transforming the Boolean condition into an arithmetic and/or bitwise expression of the Boolean condition comprises:

subtracting B from A;

computing an absolute value of a result of the subtracting B from A;

computing an exponent based on the absolute value of a result of the subtracting B from A;

computing an exponential by exponentiation of a base number by the computed exponent; and computing the arithmetic and/or bitwise expression of the Boolean condition based on a remainder of a division of the exponential by the base number.

41. The method of claim 40, wherein the Boolean condition is A=B, wherein the first and second variables A and B are floating point type data, and wherein transforming the Boolean condition into an arithmetic and/or bitwise expression of the Boolean condition comprises:

computing the exponent as a result of a ceiling function applied to the absolute value of the result of the subtracting B from A; and computing the arithmetic and/or bitwise expression of the Boolean condition as the remainder of the division of the exponential by the base number.

42. The method of claim 40, wherein the Boolean condition is A>B, wherein the first and second variables A and B are floating point type data, and wherein transforming the Boolean condition into an arithmetic and/or bitwise expression of the Boolean condition comprises:

subtracting the result of the subtracting B from A from the absolute value of the result of the subtracting B from A;

computing the exponent as a result of a ceiling function applied to an absolute value of a result of the subtracting the result of the subtracting B from A from the absolute value of the result of the subtracting B from A; and computing the arithmetic and/or bitwise expression of the Boolean condition as the remainder of the division of the exponential by the base number.

43. The method of claim 40, wherein the Boolean condition is A<B, wherein the first and second variables A and B are floating point type data, and wherein transforming the Boolean condition into an arithmetic and/or bitwise expression of the Boolean condition comprises:

subtracting the result of the subtracting B from A from the absolute value of the result of the subtracting B from A;

computing the exponent as a result of a ceiling function applied to an absolute value of a result of the subtracting the result of the subtracting B from A from the absolute value of the result of the subtracting B from A;

computing the exponential by exponentiation of the base number by the exponent; and computing the arithmetic and/or bitwise expression of the Boolean condition as 1 minus the remainder of division of the exponential by the base number.

44. The method of claim 40, wherein the first and second variables A and B are Boolean type data, wherein the Boolean condition is A=B, and wherein transforming the Boolean condition into an arithmetic and/or bitwise expression of the Boolean condition comprises:

computing a sum of A and B; and computing the arithmetic and/or bitwise expression of the Boolean condition as 1 minus a remainder of division of the sum by the base number.

* * * * *